US012438035B2

(12) United States Patent
Kori et al.

(10) Patent No.: US 12,438,035 B2
(45) Date of Patent: Oct. 7, 2025

(54) SEMICONDUCTOR DEVICE AND METHOD FOR MANUFACTURING THE SAME

(71) Applicant: ROHM CO., LTD., Kyoto (JP)

(72) Inventors: Mitsuhide Kori, Kyoto (JP); Yuji Matsumoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 431 days.

(21) Appl. No.: 17/794,867

(22) PCT Filed: Mar. 4, 2021

(86) PCT No.: PCT/JP2021/008507
§ 371 (c)(1),
(2) Date: Jul. 22, 2022

(87) PCT Pub. No.: WO2021/187145
PCT Pub. Date: Sep. 23, 2021

(65) Prior Publication Data
US 2023/0054315 A1 Feb. 23, 2023

(30) Foreign Application Priority Data
Mar. 18, 2020 (JP) .................. 2020-048038

(51) Int. Cl.
H01L 21/76 (2006.01)
H01L 21/762 (2006.01)
(Continued)

(52) U.S. Cl.
CPC ....... H01L 21/76232 (2013.01); H10D 30/60 (2025.01); H10D 62/405 (2025.01)

(58) Field of Classification Search
CPC . H01L 21/76232; H01L 29/045; H01L 29/78; H01L 21/76237; H10D 30/60; H10D 62/405
(Continued)

(56) References Cited

U.S. PATENT DOCUMENTS

2001/0041421 A1* 11/2001 Park .................. H01L 21/76235
438/424
2003/0082861 A1 5/2003 Mayuzumi
(Continued)

FOREIGN PATENT DOCUMENTS

JP 2001-160589 A 6/2001
JP 2006135075 A 5/2006
(Continued)

OTHER PUBLICATIONS

International Search Report for PCT/JP2021/008507, mailed on Jun. 1, 2021.
(Continued)

Primary Examiner — Monica D Harrison
(74) Attorney, Agent, or Firm — RABIN & BERDO, P.C.

(57) ABSTRACT

The semiconductor device includes an Si chip which has a main surface facing a {100} plane, a trench which is formed by digging down the main surface and has an open end extending inclined in a <110> direction side with respect to a <100> direction in a plan view, and an oxide film which is constituted of an oxide of the Si chip and formed as a film on the main surface and at the open end.

20 Claims, 32 Drawing Sheets

(51) Int. Cl.
*H10D 30/60* (2025.01)
*H10D 62/40* (2025.01)

(58) Field of Classification Search
USPC .......................................................... 257/288
See application file for complete search history.

(56) References Cited

U.S. PATENT DOCUMENTS

2006/0197161 A1    9/2006  Takao
2013/0087854 A1    4/2013  Miwatashi

FOREIGN PATENT DOCUMENTS

JP    2010034468 A    2/2010
WO    2005/064680 A1    7/2005

OTHER PUBLICATIONS

Written Opinion of the International Searching Authority for PCT/JP2021/008507, mailed on Jun. 1, 2021.
Japanese Office Action dated Feb. 6, 2025, in the counterpart Japanese patent application No. 2022-508206.
Japanese Office Action issued for the corresponding Japanese patent application No. 2022-508206 dated Aug. 21, 2025.

* cited by examiner

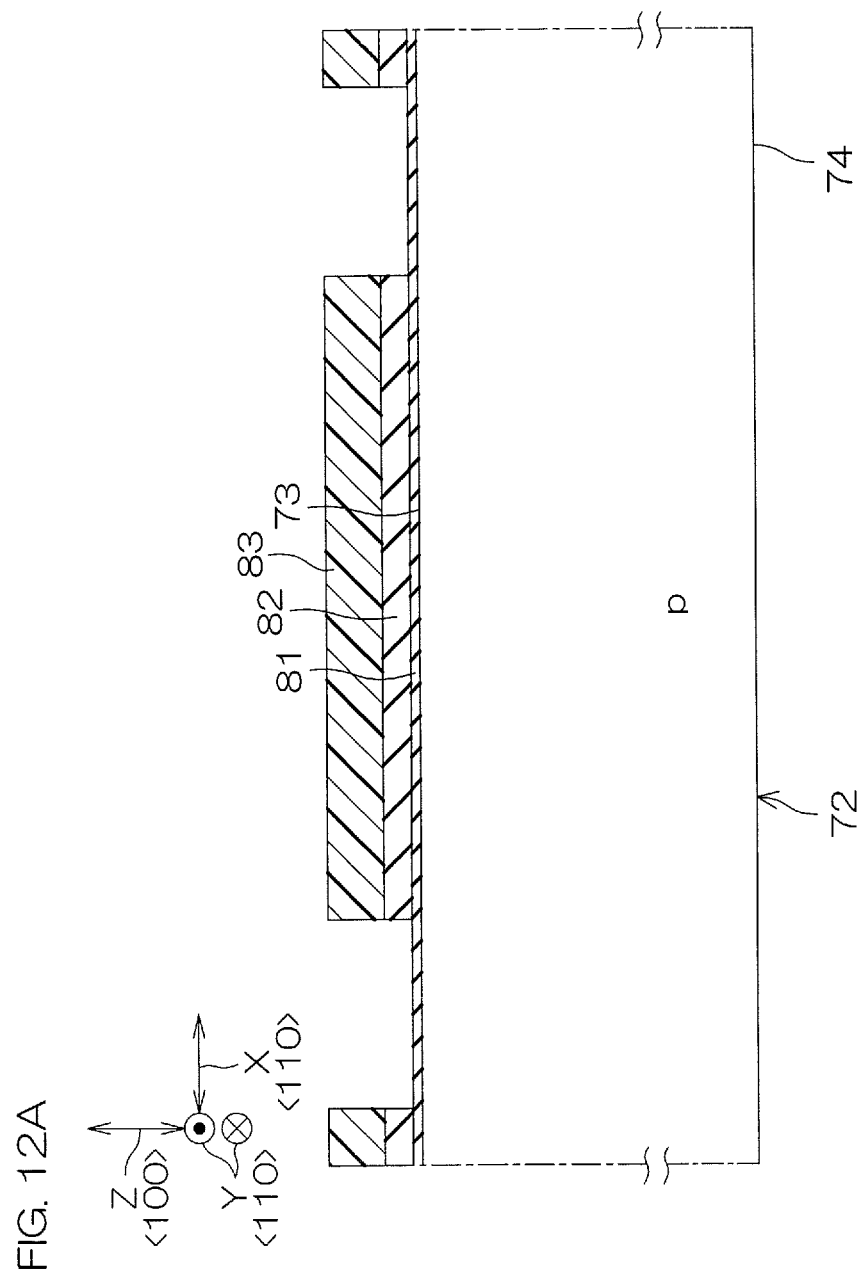

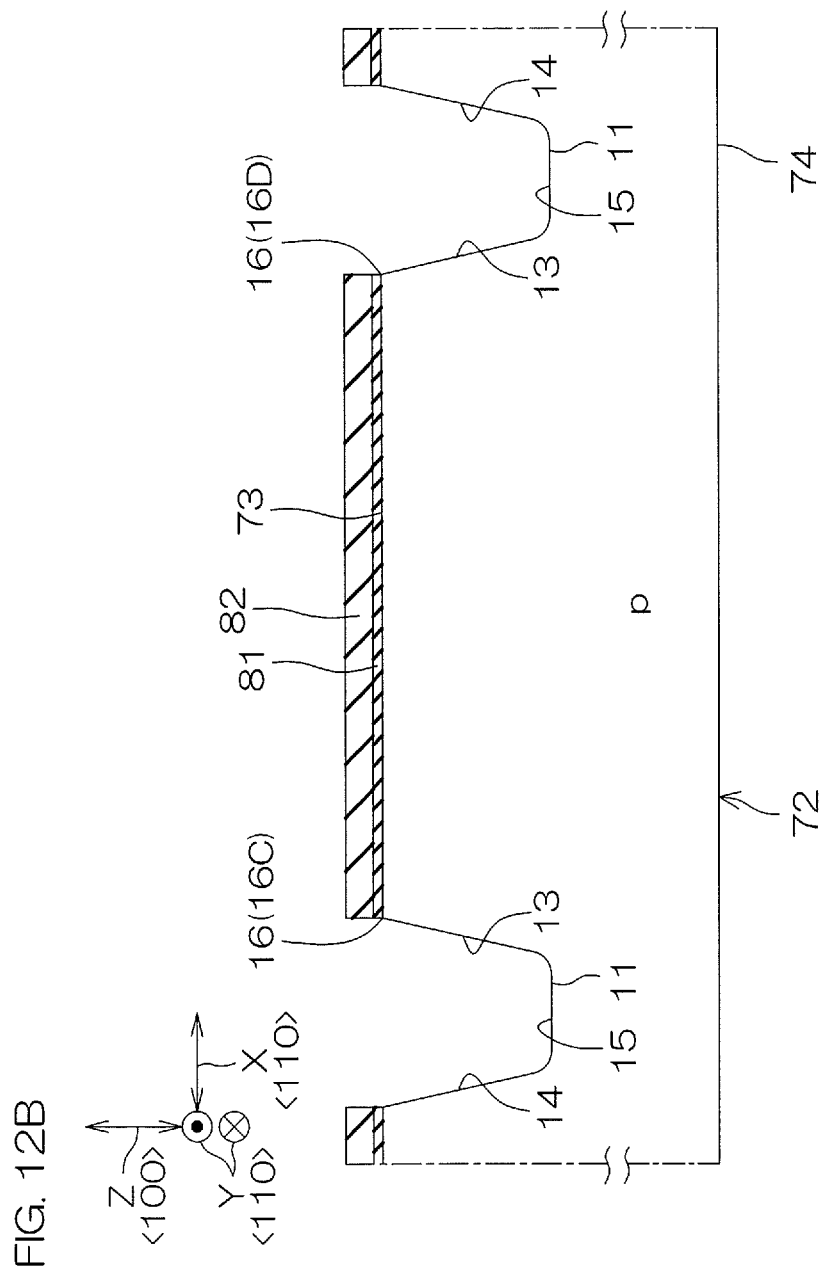

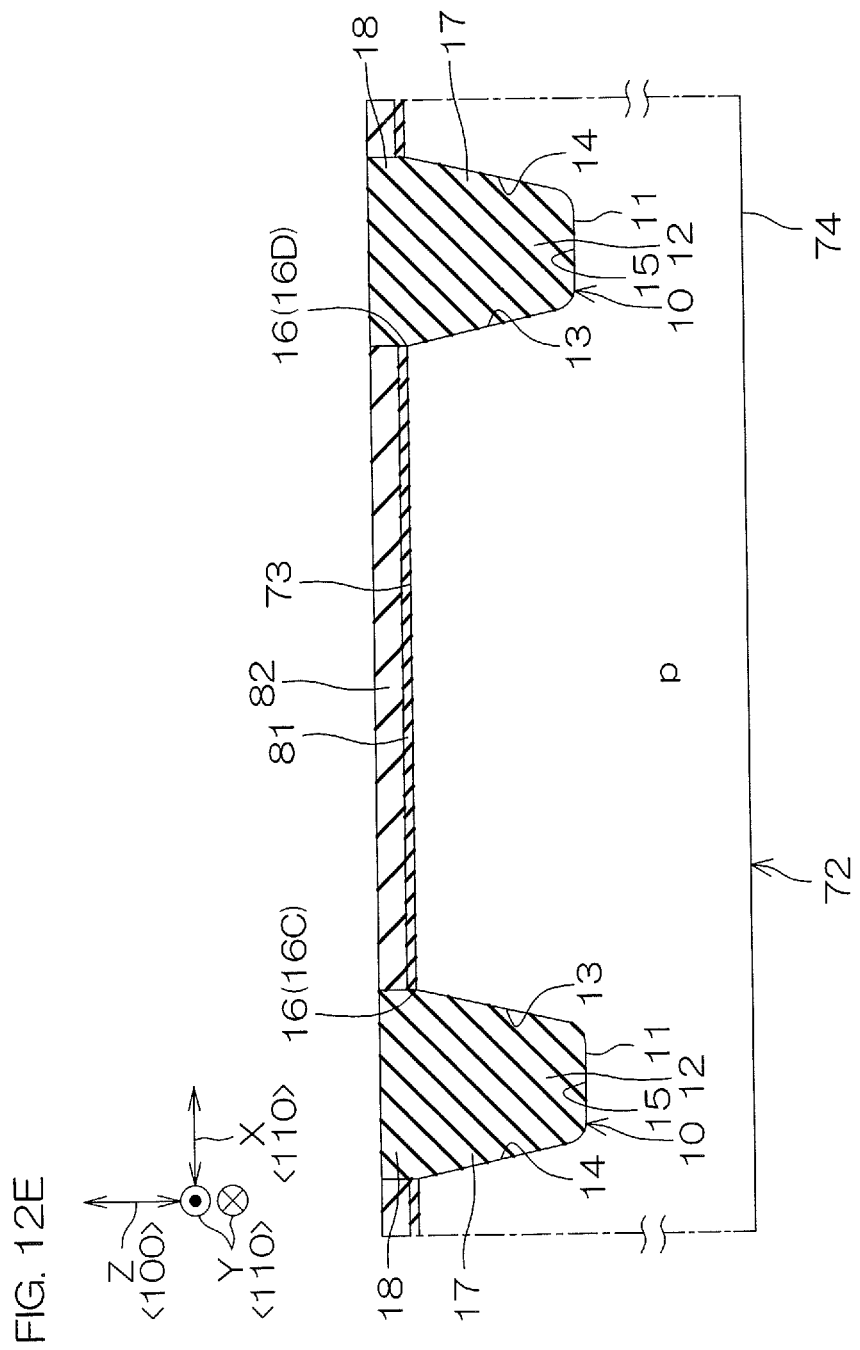

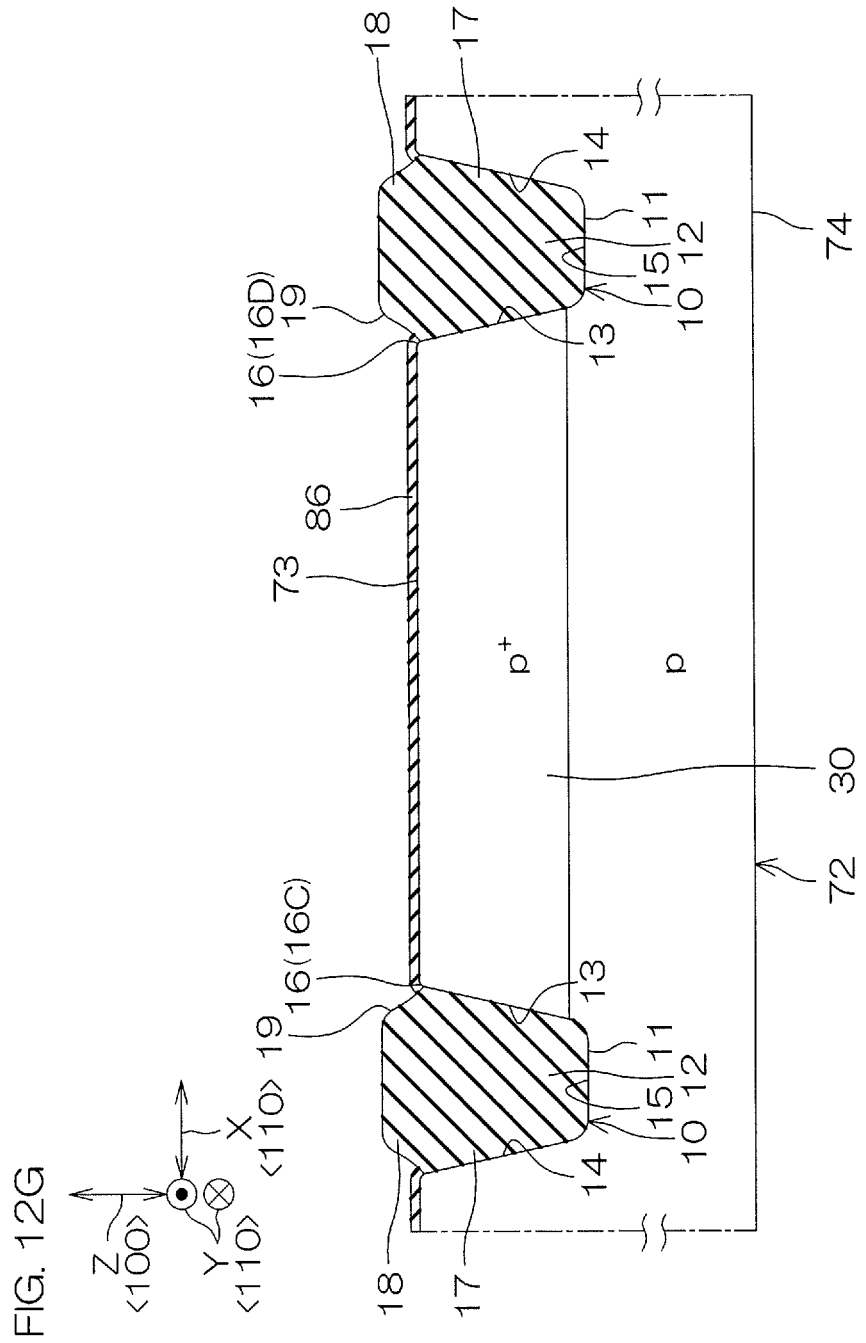

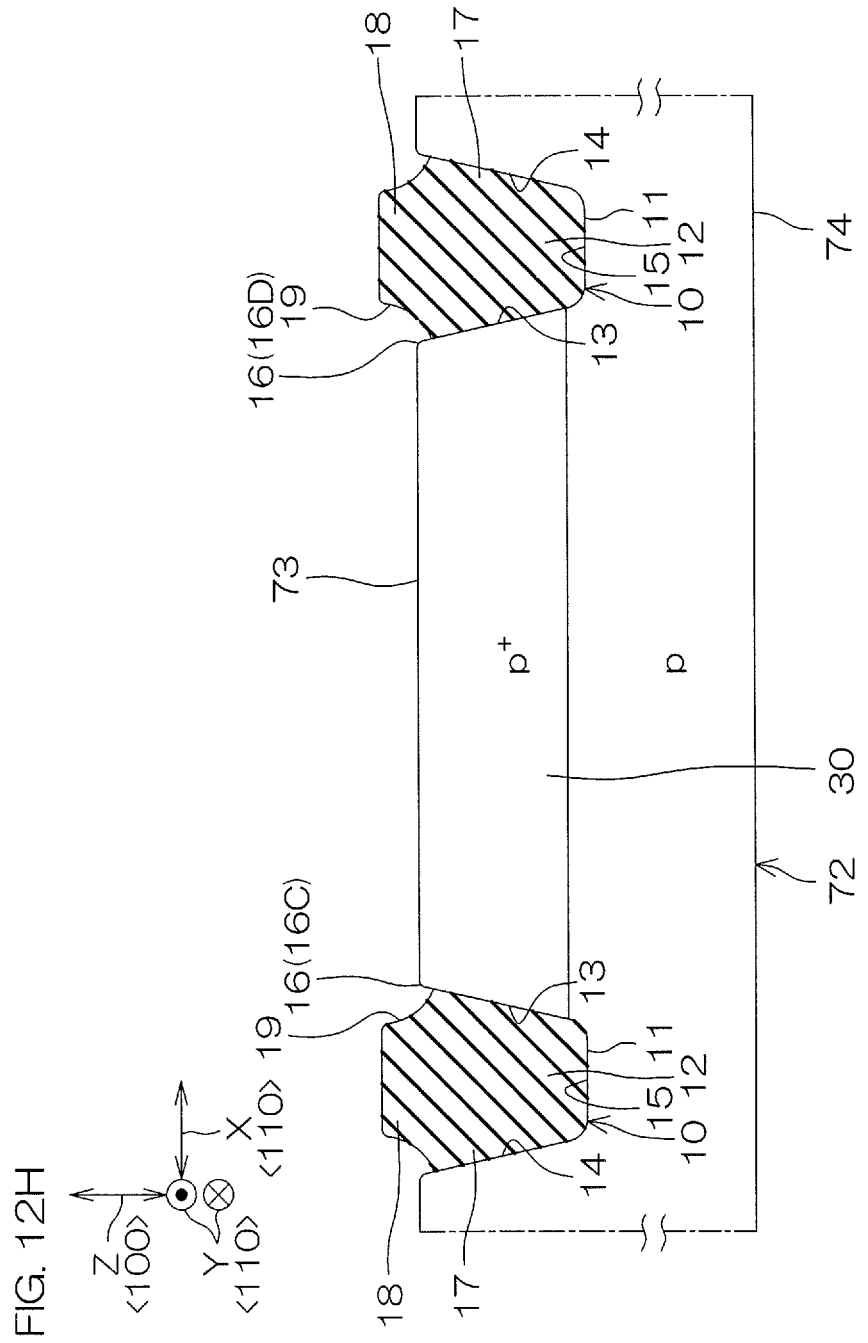

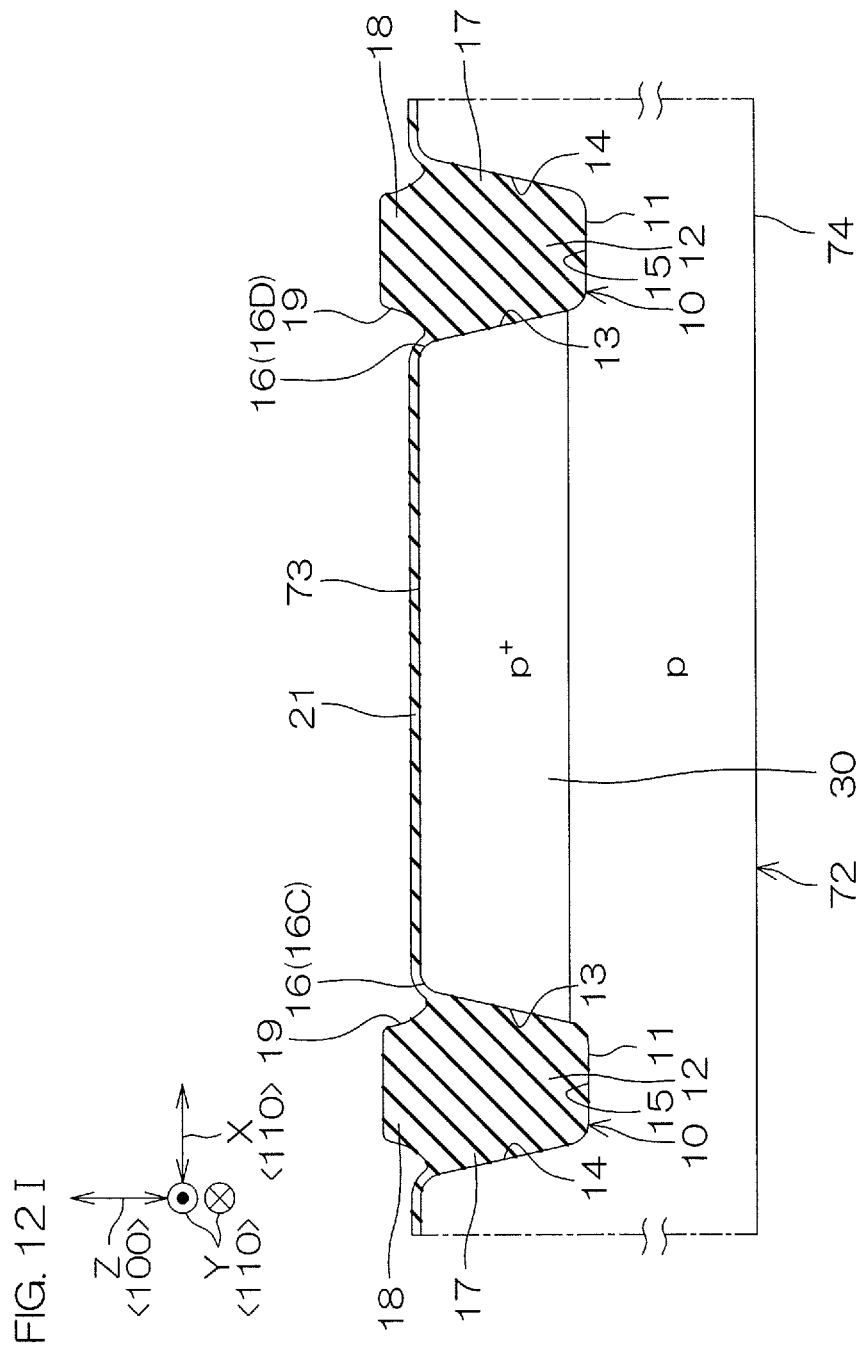

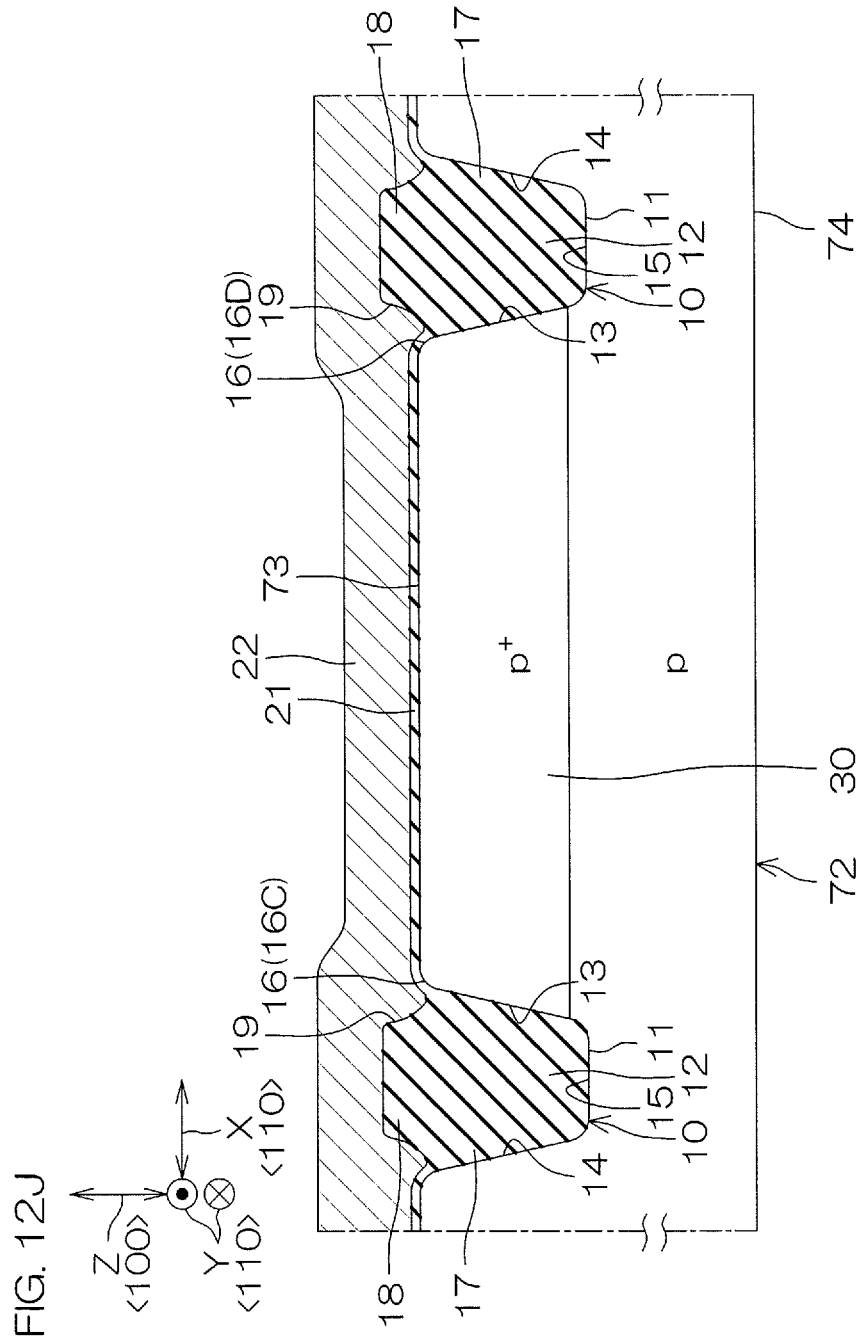

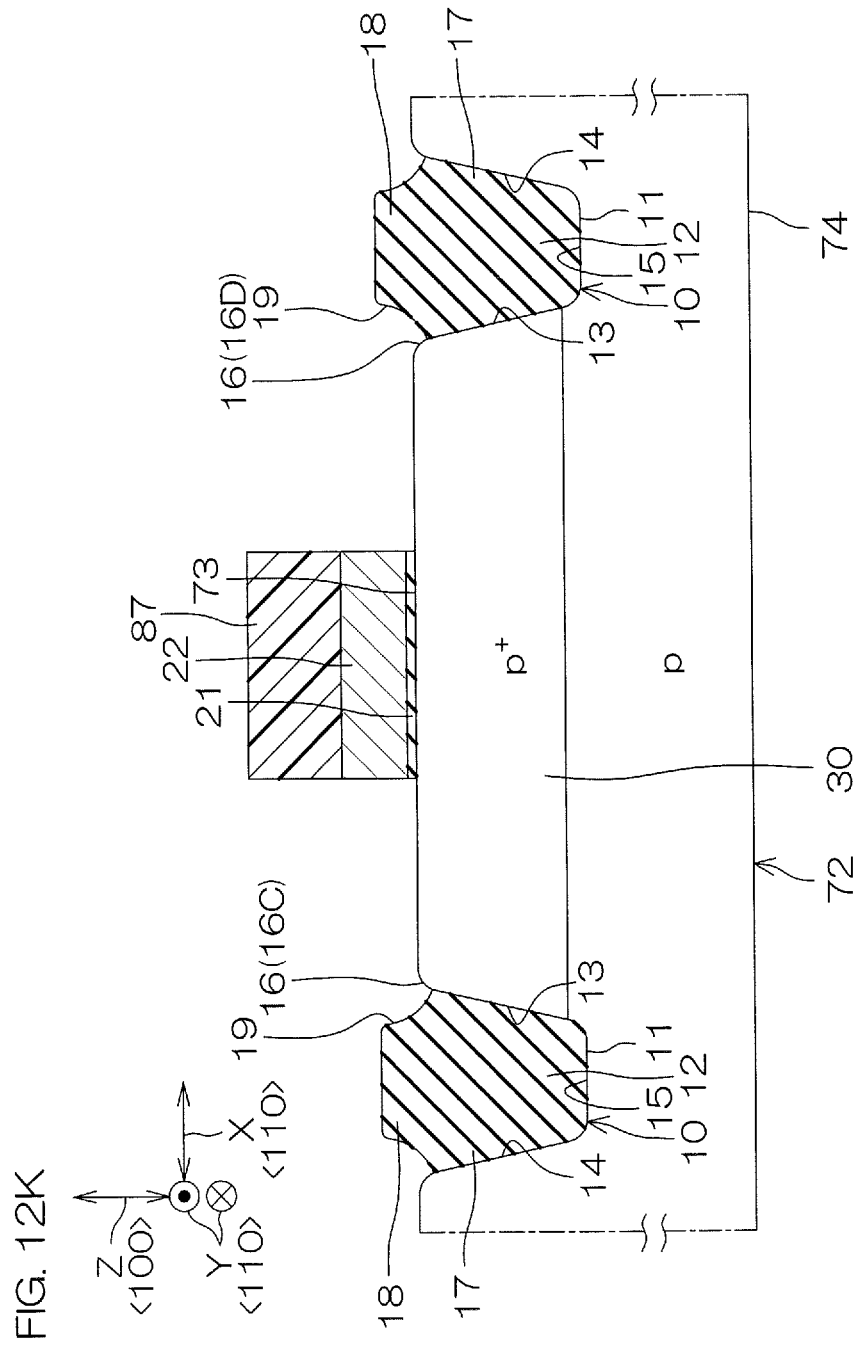

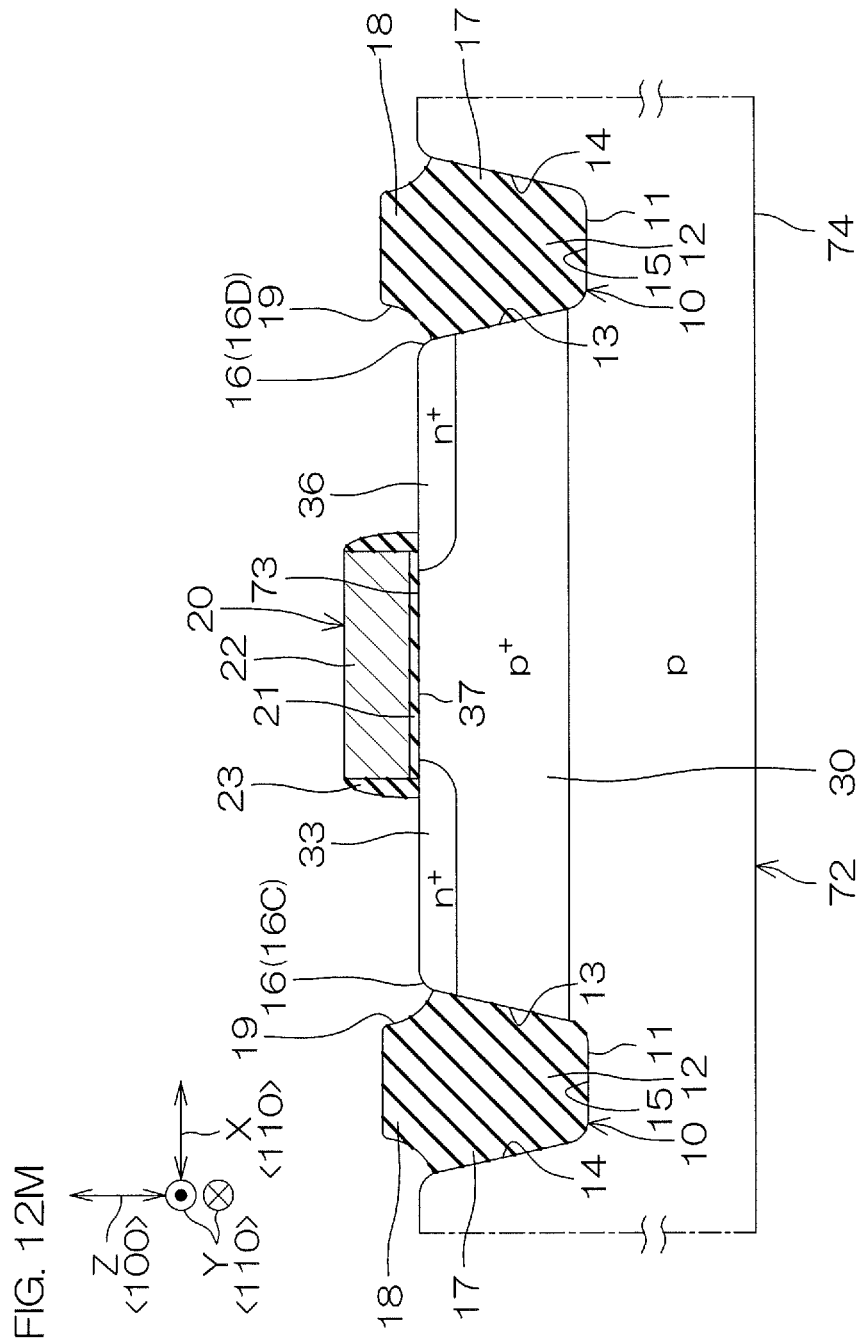

SEMICONDUCTOR DEVICE AND METHOD FOR MANUFACTURING THE SAME

TECHNICAL FIELD

The present application corresponds to Japanese Patent Application No. 2020-048038 filed with the Japan Patent Office on Mar. 18, 2020, the entire disclosure of which is incorporated herein by reference. The present invention relates to a semiconductor device including an oxide film that covers an open end of a trench and a method for manufacturing the semiconductor device.

BACKGROUND ART

Patent Literature 1 discloses a semiconductor device including an oxide film that covers an open end of a trench. FIG. 13 of Patent Literature 1 discloses a mechanism of a problem found at the open end of the trench, and FIG. 6 of Patent Literature 1 discloses a structure for solving the problem. Specifically, the semiconductor device according to FIG. 13 includes a silicon substrate, an STI (shallow trench isolation), agate oxide film (oxide film) and a gate electrode.

The STI includes a trench which is formed in the silicon substrate and an insulating embedded material which is embedded in the trench such as to expose the open end. The gate oxide film has a thin film portion at the open end of the trench. The gate electrode faces the open end of the trench across the thin film portion of the gate oxide film. In the semiconductor device, where a gate voltage is less than a threshold voltage, a subchannel is formed at the open end of the trench due to the thin film portion of the gate oxide film.

As a result, a hump occurs in the sub-threshold characteristics of a transistor due to a leakage current which flows through the subchannel. On the other hand, in the semiconductor device according to FIG. 6, in order to suppress the hump, a portion which covers the open end of the trench in the gate oxide film is formed thicker than other portions. The above-described gate oxide film is formed by executing a thermal oxidation treatment after introduction of fluoride ions into the open end of the trench.

Patent Literature 2 discloses a semiconductor device capable of suppressing a hump in still another mode. Specifically, this semiconductor device includes a silicon substrate, an STI, a gate oxide film (oxide film) and a gate electrode. The STI includes a trench formed in a silicon substrate and an insulating embedded material which is embedded in the trench such as to expose an open end. The trench includes a tapered portion and a trench main body portion.

The tapered portion is formed at the open end of the trench and has a relatively gradual inclination angle. The trench main body portion is formed on the bottom wall side of the trench with respect to the tapered portion and has an inclination angle which is steeper than the tapered portion. The gate oxide film covers the tapered portion at the open end of the trench. This semiconductor device suppresses thinning of the gate oxide film at the open end of the trench by introducing the tapered portion into the trench.

CITATION LIST

Patent Literature

Patent Literature 1: United States Patent Application Publication No. 2003-082861

Patent Literature 2: United States Patent Application Publication No. 2013-087854

SUMMARY OF INVENTION

Technical Problem

A preferred embodiment of the present invention provides a semiconductor device capable of suppressing thinning of an oxide film at an open end of a trench by a novel structure and a method for manufacturing the semiconductor device.

Solution to Problem

A preferred embodiment of the present invention provides a semiconductor device including an Si chip which has a main surface facing a {100} plane, a trench which is formed by digging down the main surface and has an open end extending inclined in a <110> direction side with respect to a <100> direction in a plan view, and an oxide film which is constituted of an oxide of the Si chip and formed as a film on the main surface and at the open end.

A preferred embodiment of the present invention provides a method for manufacturing a semiconductor device including a step of preparing an Si wafer having a main surface that faces a {100} plane, a step of partially removing the main surface and forming a trench that has an open end extending inclined in a <110> direction side with respect to a <100> direction in a plan view, and a step of forming an oxide film as a film on the main surface and at the open end by an oxidation treatment method to the main surface.

A growth rate of the oxide film at the open end of the trench varies depending on a crystal orientation of an Si monocrystal which forms the open end of the trench. Specifically, the growth rate of the oxide film increases as a direction in which the open end of the trench extends comes close to the <110> direction of the Si monocrystal from the <100> direction of the Si monocrystal. In contrast thereto, the growth rate of the oxide film decreases as the direction in which the open end of the trench extends comes close to the <100> direction of the Si monocrystal from the <110> direction of the Si monocrystal.

Therefore, the trench that has the open end extending inclined in the <110> direction side with respect to the <100> direction is formed, thus making it possible to enhance the growth rate of the oxide film at the open end. As a result, it is possible to suppress thinning of the oxide film at the open end of the trench.

The aforementioned as well as yet other objects, features and effects of the present invention will be made clear by the following description of the preferred embodiments with reference to accompanying drawings.

BRIEF DESCRIPTION OF DRAWINGS

FIG. 12A is a cross-sectional view for describing one example of a method for manufacturing the semiconductor device shown in FIG. 4.

FIG. 12B is a cross-sectional view which shows a step subsequent to that of FIG. 12A.

FIG. 12E is a cross-sectional view which shows a step subsequent to that of FIG. 12D.

FIG. 12G is a cross-sectional view which shows a step subsequent to that of FIG. 12F.

FIG. 12H is a cross-sectional view which shows a step subsequent to that of FIG. 12G.

FIG. 12I is a cross-sectional view which shows a step subsequent to that of FIG. 12H.

FIG. 12J is a cross-sectional view which shows a step subsequent to that of FIG. 12I.

FIG. 12K is a cross-sectional view which shows a step subsequent to that of FIG. 12J.

FIG. 12M is a cross-sectional view which shows a step subsequent to that of FIG. 12L.

DESCRIPTION OF EMBODIMENTS

Figure 1:
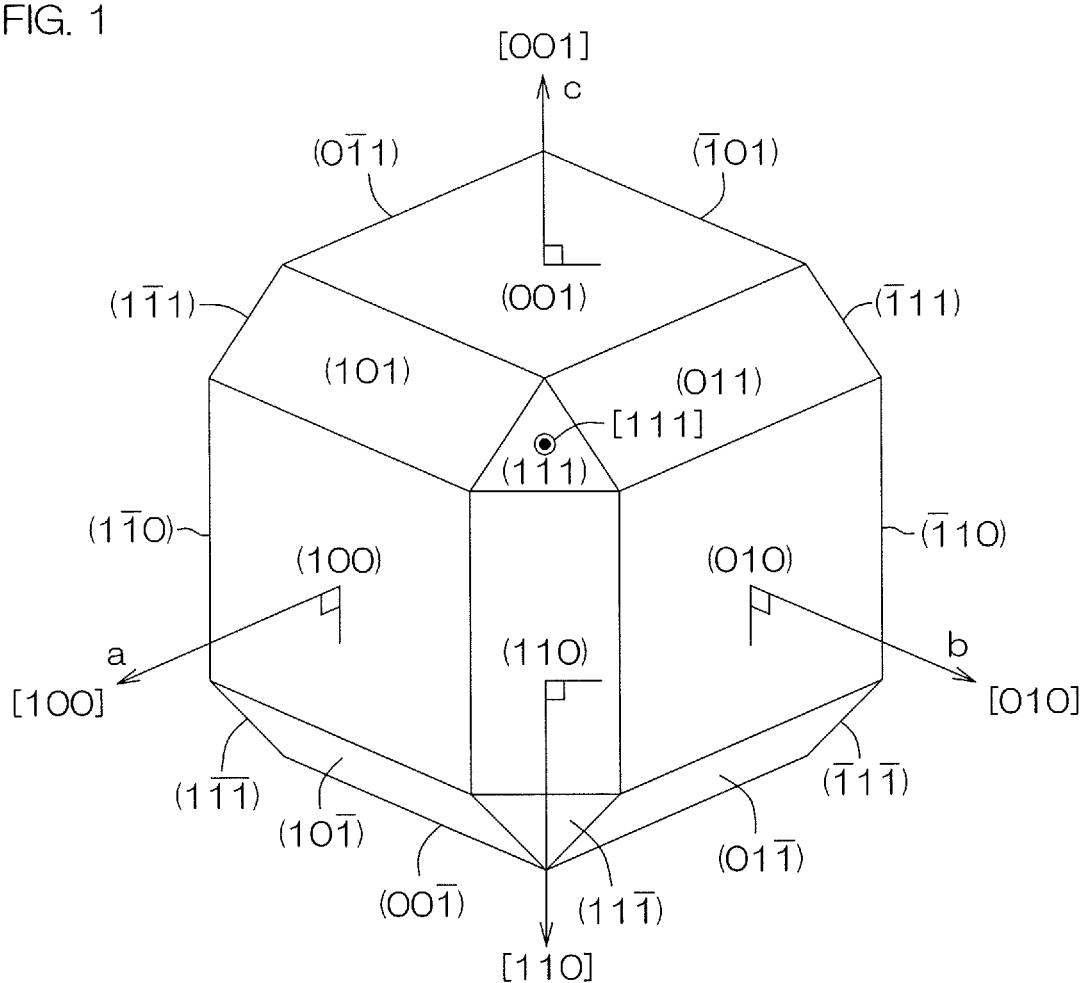
FIG. 1 is a perspective view which shows a crystalline structure of an Si monocrystal by Miller indices.
Figure 2:
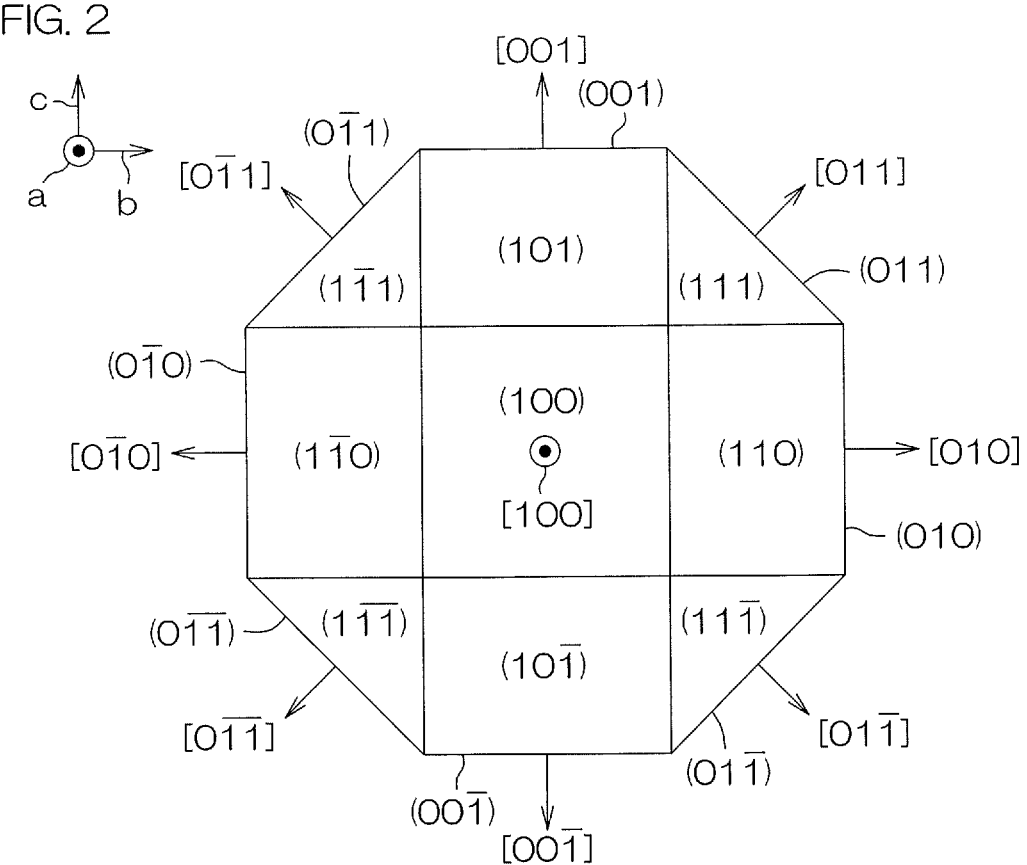
FIG. 2 is a plan view of the Si monocrystal shown in FIG. 1 as viewed in an a-axis direction.
Figure 3:
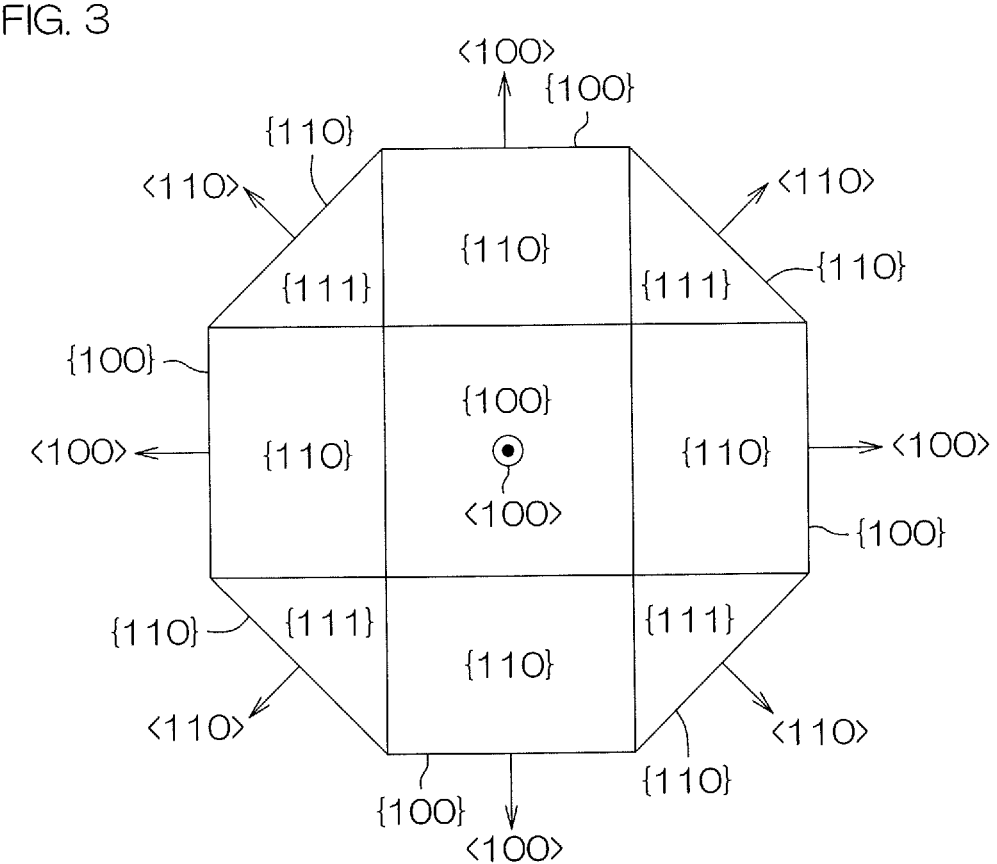
FIG. 3 is a plan view which shows the Si monocrystal shown in FIG. 2 by equivalent Miller indices.

FIG. 1 is a perspective view which shows a crystalline structure of an Si monocrystal by Miller indices. FIG. 2 is a plan view of the Si monocrystal shown in FIG. 1 as viewed in an a-axis direction. FIG. 3 is a plan view which shows the Si monocrystal shown in FIG. 2 by equivalent Miller indices.

With reference to FIG. 1 to FIG. 3, a crystal plane and a crystal direction of the Si monocrystal are expressed by Miller indices using three coordinate axes (a, b, c) which include an a-axis, a b-axis and a c-axis. FIG. 1 to FIG. 3 each show three representative crystal planes and also three representative crystal directions of the Si monocrystal. The crystal planes of the Si monocrystal are expressed as (abc) planes. The crystal directions of the Si monocrystal are defined by normal directions of the crystal planes of the Si monocrystal and expressed as [abc] directions.

The Si monocrystal has a structure which is four-fold symmetrical to each of the coordinate axes and has an equivalent crystal plane and an equivalent crystal direction at every 90°. An equivalent crystal plane group of the Si monocrystal is expressed as {abc} planes, and an equivalent crystal direction group of the Si monocrystal is expressed as <abc> directions. In principle, each of "a," "b" and "c" takes on any one of the numerical values of "0," "1" and "−1."

The Si monocrystal includes, as a crystal plane orthogonal to each of the coordinate axes, a (100) plane, a (010) plane, a (001) plane, a (−100) plane, a (0-10) plane and a (00-1) plane. These crystal planes constitute the equivalent crystal plane group and are expressed as a {100} plane. The equivalent crystal direction group which extends in a normal direction of the {100} plane is expressed as a <100> direction.

The Si monocrystal includes, as a crystal plane that is inclined at 45° with respect to the {100} plane, a (110) plane, a (−110) plane, a (1-10) plane, a (−1-10) plane, a (101) plane, a (−101) plane, a (10-1) plane, a (−10-1) plane, a (011) plane, a (0-11) plane, a (01-1) plane and a (0-1-1) plane. These crystal planes constitute the equivalent crystal plane group and are expressed as a {110} plane. The equivalent crystal direction group which extends in a normal direction of the {110} plane is expressed as a <110> direction.

The Si monocrystal includes, as a crystal plane that is inclined at 45° with respect to the {100} plane and the {110} plane, a (111) plane, a (−111) plane, a (1-11) plane, a (11-1) plane, a (−1-11) plane, a (−11-1) plane, a (1-1-1) plane and a (−1-1-1) plane. These crystal planes constitute the equivalent crystal plane group and are expressed as a {111} plane. The equivalent crystal direction group which extends in a normal direction of the {111} plane is expressed as a <111> direction.

Figure 4:
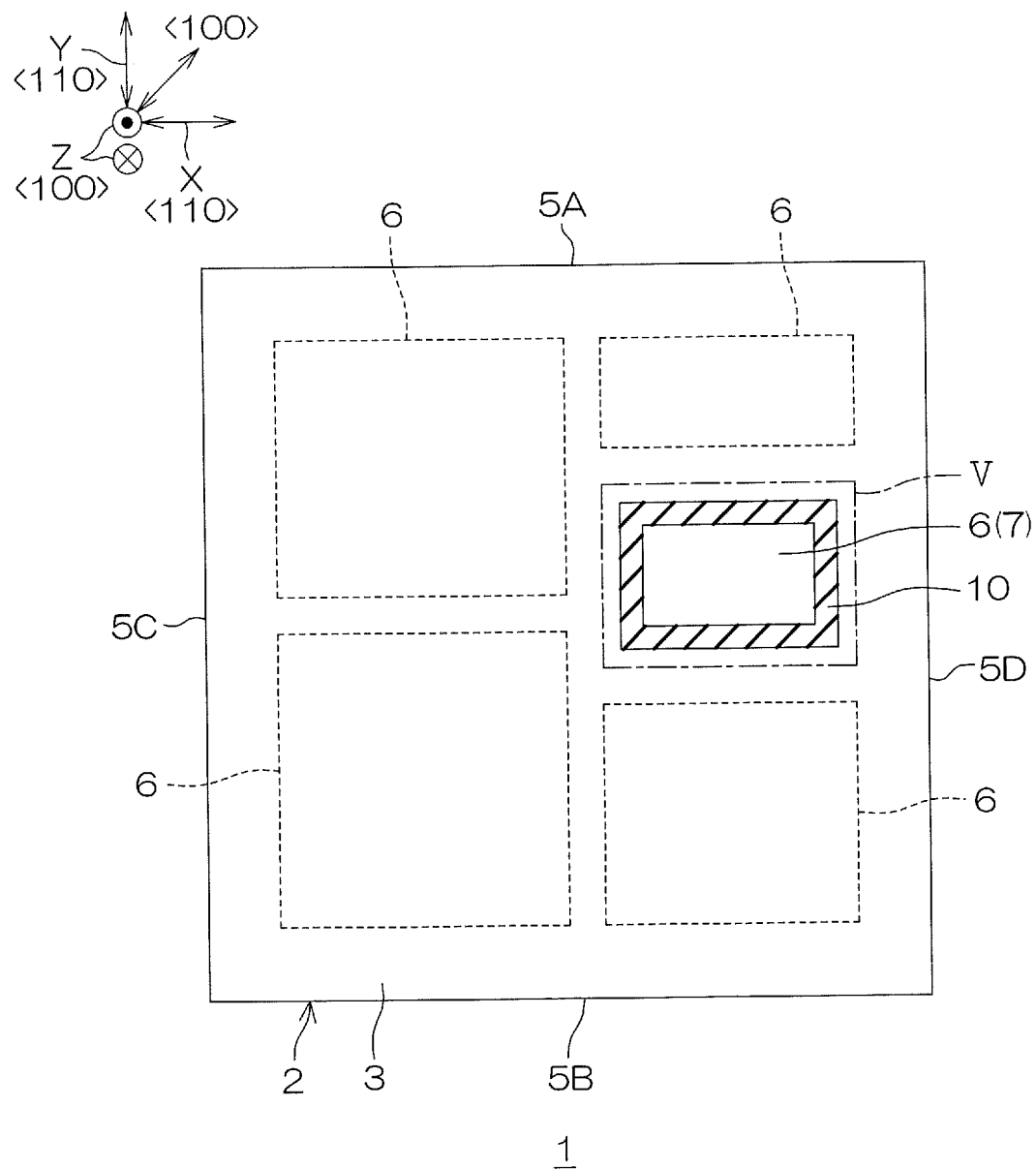
FIG. 4 is a plan view which shows an Si chip of a semiconductor device according to a preferred embodiment of the present invention.

FIG. 4 is a plan view which shows an Si chip 2 of a semiconductor device 1 according to a preferred embodiment of the present invention. With reference to FIG. 4, the semiconductor device 1 includes the Si chip 2 which is constituted of an Si monocrystal. In this embodiment, the Si chip 2 has a single layer structure which is constituted of an Si substrate of a p-type (first conductive type) that is formed in a rectangular parallelepiped shape.

The Si chip 2 has a first main surface 3 on one side, a second main surface 4 on the other side and first to fourth side surfaces 5A to 5D which connect the first main surface 3 and the second main surface 4. The first main surface 3 and the second main surface 4 are formed in a quadrilateral shape (in this embodiment, in a square shape) in a plan view, as viewed in a normal direction Z thereto (hereinafter, simply referred to "in a plan view").

The first main surface 3 and the second main surface 4 face the {100} plane of the Si monocrystal. Where the first main surface 3 is expressed as the (100) plane, the second main surface 4 is expressed as the (−100) plane (refer to FIG. 1 to FIG. 3 as well). In this embodiment, the first main surface 3 is constituted of a {100} just plane that does not have an off angle. The first main surface 3 may have an off angle which is inclined in the <100> direction or the <110> direction with respect to the {100} plane. In this case, the off angle may be more than 0° and not more than 5° (preferably, not more than 1°).

The first to fourth side surfaces 5A to 5D include the first side surface 5A, the second side surface 5B, the third side surface 5C and the fourth side surface 5D. The first side surface 5A and the second side surface 5B extend along a first direction X and face a second direction Y that is orthogonal to the first direction X. The third side surface 5C and the fourth side surface 5D extend along the second direction Y and face the first direction X.

The first to fourth side surfaces 5A to 5D each face the {110} plane. Specifically, the first side surface 5A (second side surface 5B) faces the {110} plane, and the third side surface 5C (fourth side surface 5D) faces the {110} plane which is orthogonal to the first side surface 5A (second side surface 5B). Where the first side surface 5A is expressed as the (011) plane, the second side surface 5B is expressed as the (0-1-1) plane, the third side surface is expressed as the (0-11) plane, and the fourth side surface 5D is expressed as the (01-1) plane (refer to FIG. 1 to FIG. 3 as well). That is, the first direction X is constituted of the <110> direction, and the second direction Y is constituted of the <110> direction that is orthogonal to the first direction X.

The semiconductor device 1 includes a plurality of device regions 6 which are demarcated in the first main surface 3. The number of the plurality of device regions 6 and an arrangement thereof are arbitrary. The plurality of device regions 6 each include a functional device which is formed by utilizing the first main surface 3 and/or a surface layer portion of the first main surface 3. The functional device may include at least one of a semiconductor switching device, a semiconductor rectifying device and a passive device. The functional device may include a circuit network in which the semiconductor switching device, the semiconductor rectifying device and the passive device are combined.

The semiconductor switching device may include at least one of a MOSFET (Metal Oxide Semiconductor Field Effect Transistor), a BJT (Bipolar Junction Transistor), an IGBT (Insulated Gate Bipolar Junction Transistor) and a JFET (Junction Field Effect Transistor). The semiconductor rectifying device may include at least one of a pn junction diode, a pin junction diode, a Zener diode, a Schottky barrier diode and a fast recovery diode. The passive device may include at least one of a resistor, a capacitor, and an inductor.

Figure 5:
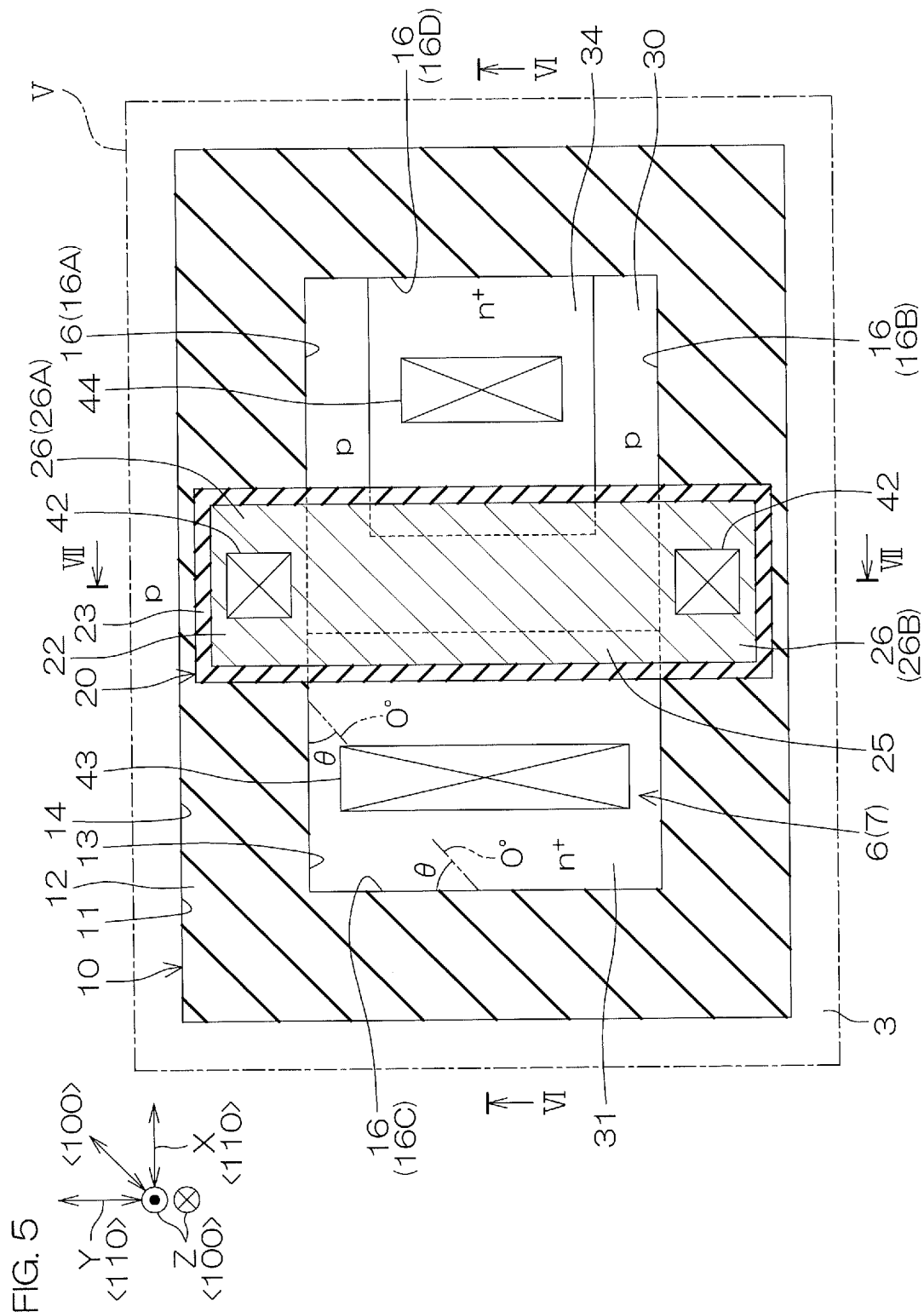
FIG. 5 is an enlarged view of a region V shown in FIG. 4.
Figure 6:
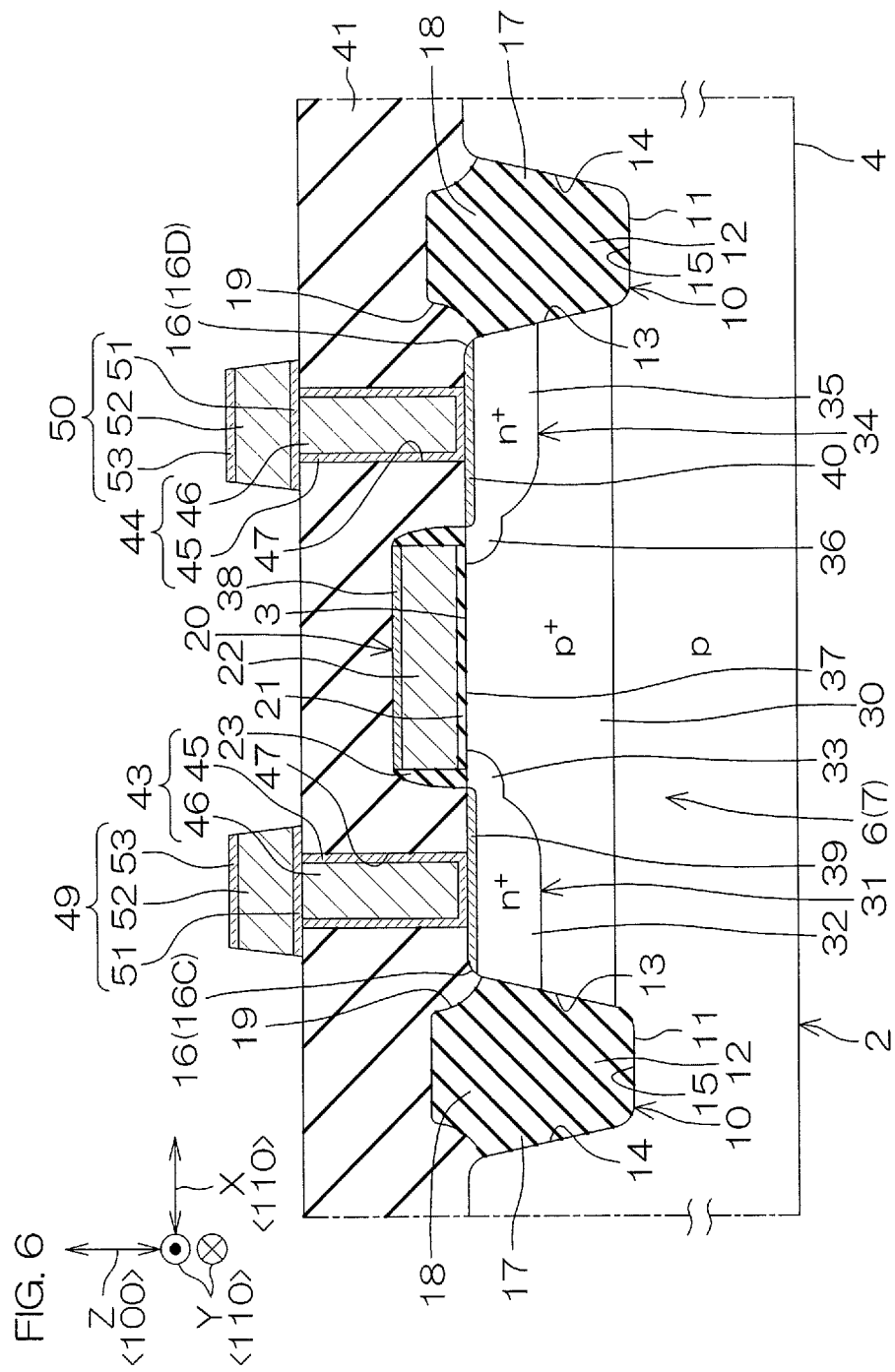
FIG. 6 is a cross-sectional view along line VI-VI shown in FIG. 5.
Figure 7:
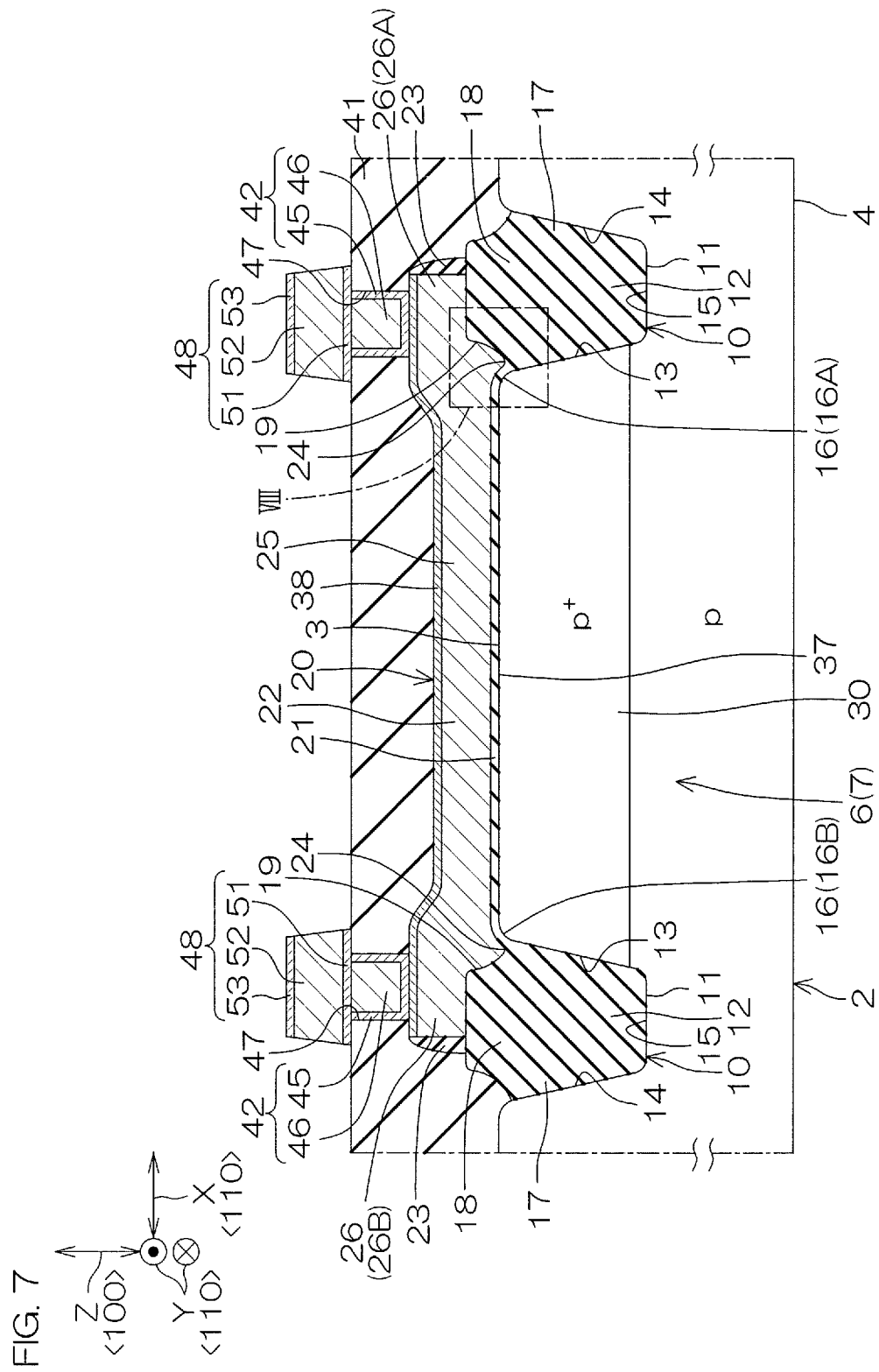
FIG. 7 is a cross-sectional view along line VII-VII shown in FIG. 5.
Figure 8:
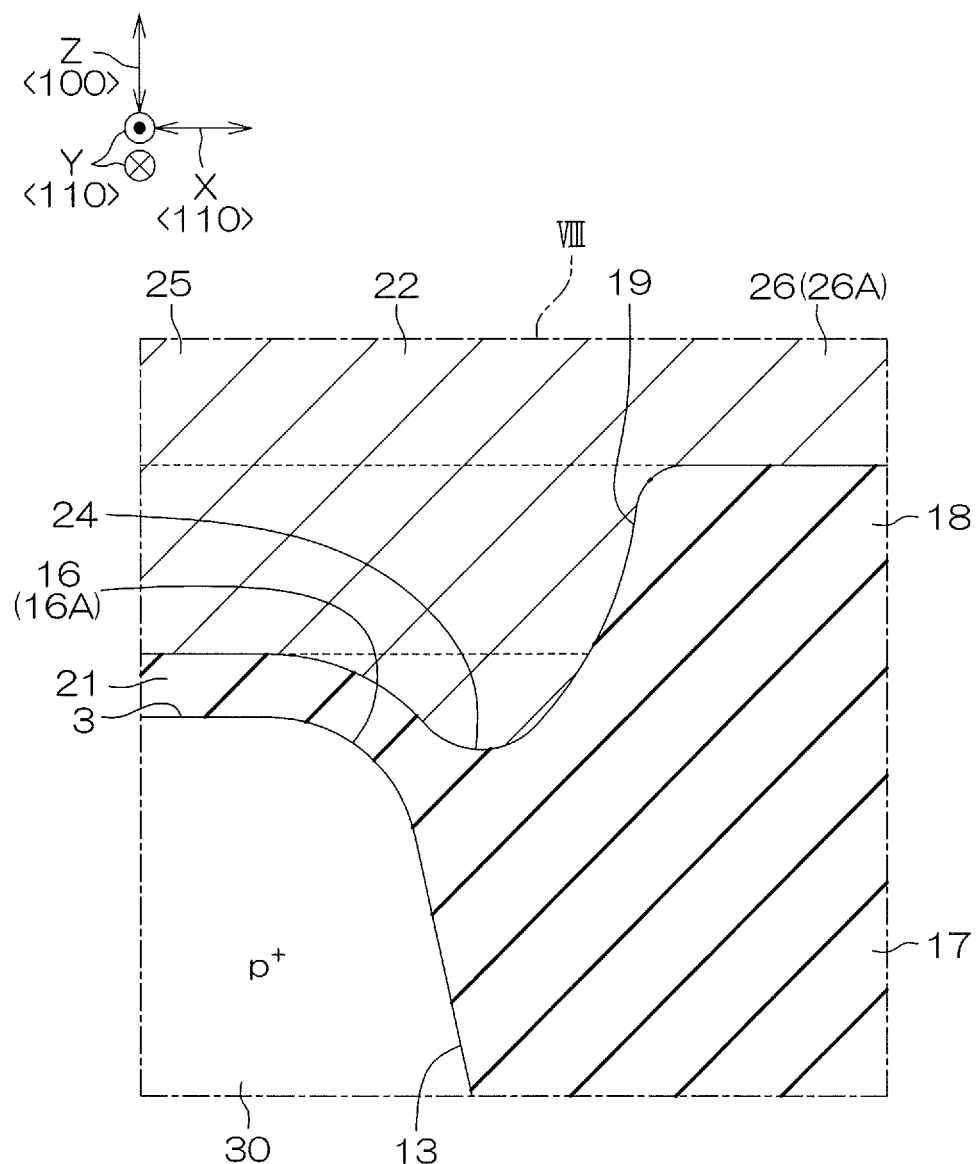
FIG. 8 is an enlarged view of a region VIII shown in FIG. 7.

FIG. 5 is an enlarged view of the region V shown in FIG. 4. FIG. 6 is a cross-sectional view along line VI-VI shown in FIG. 5. FIG. 7 is a cross-sectional view along line VII-VII shown in FIG. 5. FIG. 8 is an enlarged view of the region VIII shown in FIG. 7. Hereinafter, of the plurality of device regions 6, a device region 6 in which a MOSFET 7 is formed will be specifically described.

With reference to FIG. 5 to FIG. 8, the semiconductor device 1 includes a trench insulating structure 10 which is formed in the first main surface 3 to demarcate the device region 6. The trench insulating structure 10 includes a trench 11 and an insulating embedded material 12. The trench 11 is formed by digging down the first main surface 3 toward the second main surface 4. The trench 11 is formed in a quadrilateral annular shape in a plan view and demarcates the device region 6 which is in a quadrilateral shape.

Specifically, the trench 11 includes an inner sidewall 13 on one side, an outer sidewall 14 on the other side and a bottom wall 15 which connects the inner sidewall 13 and the outer sidewall 14. The inner sidewall 13 is formed in a quadrilateral annular shape in a plan view. The outer sidewall 14 is formed in a quadrilateral annular shape extending in parallel with the inner sidewall 13 in a plan view. The outer sidewall 14 is not necessarily required to extend in parallel with the inner sidewall 13 and may be formed in a shape different from that of the inner sidewall 13. The bottom wall 15 extends in parallel with the first main surface 3. The bottom wall 15 may be formed in a curved shape toward the second main surface 4.

The trench 11 demarcates the device region 6 by an open end 16 of the inner sidewall 13. The open end 16 of the trench 11 is formed in a curved shape toward an interior of the trench 11. The open end 16 of the trench 11 extends inclined in the <110> direction side with respect to the <100> direction in a plan view. An inclination angle θ of the open end 16 in a plan view is more than 0° and not more than 45°.

The inclination angle θ is defined by an inclination angle of the open end 16 in the <100> direction when the <100> direction is given as 0°. Where the inclination angle θ is 45°, the inclined direction of the open end 16 is the <110> direction. The inclination angle θ may be in any range of more than 0° and not more than 15°, not less than 15° and not more than 30°, and not less than 30° and not more than 45°. The inclination angle θ is preferably more than 25°. The inclination angle θ is more preferably not less than 40° and not more than 45°. The inclination angle θ is in particularly preferably not less than 44° and not more than 45°.

Specifically, the open end 16 includes first to fourth open ends 16A to 16D each of which extends inclined in the <110> direction side with respect to the <100> direction. The first open end 16A and the second open end 16B extend in the first direction X and face the second direction Y. The third open end 16C and the fourth open end 16D extend in the second direction Y and face the first direction X. That is, the first open end 16A (second open end 16B) extends in the <110> direction, and the third open end 16C (fourth open end 16D) extends in the <110> direction which is orthogonal to the first open end 16A (second open end 16B). Thereby, the device region 6 is demarcated into the quadrilateral shape having four sides each of which extends in the <110> direction in a plan view.

In this embodiment, the trench 11 is formed in a tapered shape in which an open width narrows toward the bottom wall 15. A taper angle of the trench 11 may be more than 90° and not more than 125°. The taper angle of the trench 11 is an angle which is formed between the inner sidewall 13 (outer sidewall 14) of the trench 11 and the first main surface 3 inside the Si chip 2. The taper angle is preferably more than 90° and not more than 100°. As a matter of course, the trench 11 may be formed vertical to the first main surface 3.

A depth of the trench 11 may be not less than 0.1 μm and not more than 1 μm. A width of the trench 11 is arbitrary. The width of the trench 11 may be not less than 0.1 μm and not more than 10 μm. The width of the trench 11 is defined by a width of a direction orthogonal to a direction in which the trench 11 extends.

The insulating embedded material 12 is embedded in the trench 11 such as to expose the open end 16. An insulator which constitutes the insulating embedded material 12 is arbitrary as long as the insulating embedded material 12 exposes the open end 16. The insulating embedded material 12 may contain at least one of silicon oxide ($SiO_2$) and silicon nitride (SiN). In this embodiment, the insulating embedded material 12 is constituted of a silicon oxide.

The insulating embedded material 12 includes an embedded portion 17 and a protruded portion 18. The embedded portion 17 is positioned on the bottom wall 15 side of the trench 11 with respect to the open end 16. The protruded portion 18 protrudes from the embedded portion 17 toward the first main surface 3 side and is positioned at an upper side than the first main surface 3. The insulating embedded material 12 has an upper surface (top) which is positioned at an upper side than the first main surface 3.

The insulating embedded material 12 has divot 19 of a notched shape recessed toward the bottom wall 15 of the trench 11 at a peripheral edge of the protruded portion 18. The protruded portion 18 is formed by the divot 19 in a tapered shape (trapezoidal shape in a cross-sectional view) toward a direction away from the trench 11 to expose the open end 16 of the trench 11.

The semiconductor device 1 includes a planar gate structure 20 which is formed on the first main surface 3 in the device region 6. The planar gate structure 20 includes a gate oxide film 21 (oxide film), a gate electrode 22 and a sidewall structure 23. The presence or absence of the sidewall structure 23 is optional and may be removed if necessary.

The gate oxide film 21 is constituted of an oxide of the Si chip 2 (first main surface 3). Specifically, the gate oxide film 21 is constituted of an oxide of the Si chip 2 which is formed as a film by oxidation on the first main surface 3 and the surface layer portion of the first main surface 3. That is, the gate oxide film 21 is constituted of a silicon oxide film which is integrally formed with the first main surface 3. More specifically, the gate oxide film 21 is constituted of a thermal oxide of the Si chip 2 which is formed as a film by thermal oxidation on the first main surface 3 and the surface layer portion of the first main surface 3. That is, the gate oxide film 21 is constituted of a silicon thermal oxide film (thermal oxide film) which is integrally formed with the Si chip 2 (first main surface 3).

The gate oxide film 21 has a thickness of not less than 1 nm and not more than 100 nm. The thickness of the gate oxide film 21 is adjusted according to a drain/source voltage VDS and a dielectric withstand voltage of the MOSFET 7. Where the MOSFET 7 is an LV (Low-Voltage)-MOSFET which is actuated at a drain/source voltage VDS of more than 0V and less than 5V, the thickness of the gate oxide film 21 may be not less than 1 nm and not more than 20 nm.

Where the MOSFET 7 is a MV (Middle-Voltage)-MOSFET which is actuated at a drain/source voltage VDS of not less than 5V and less than 10V, the thickness of the gate oxide film 21 may be not less than 10 nm and not more than 50 nm. Where the MOSFET 7 is a HV (High-Voltage)-MOSFET which is actuated at a drain/source voltage VDS of not less than 10V and not more than 40V, the thickness of the gate oxide film 21 may be not less than 20 nm and not more than 100 nm.

The gate oxide film 21 is formed in a central portion of the device region 6 in a plan view and covers the device region 6 and the open end 16 of the trench 11. The gate oxide film 21 extends inclined in the <110> direction side with respect to the <100> direction in a plan view. In this embodiment, the gate oxide film 21 extends in a band shape along a facing direction of two open ends 16 (specifically, the first open end 16A and the second open end 16B) which face each other across the device region 6.

The gate oxide film 21 covers at least one or both (both in this embodiment) of the first open end 16A and the second open end 16B and intersects the trench 11. Specifically, the gate oxide film 21 extends in the <110> direction in a plan view and is orthogonal to the first open end 16A and the second open end 16B.

In the gate oxide film 21, a portion which covers the open end 16 is formed as a curved film along the open end 16 and is integrally formed with the insulating embedded material 12 inside the trench 11. The gate oxide film 21 has an upper surface which is positioned on the first main surface 3 side with respect to an upper surface of the protruded portion 18 of the insulating embedded material 12. Thereby, the gate oxide film 21 is connected to the protruded portion 18 on the first main surface 3 side with respect to the upper surface of the protruded portion 18.

The gate oxide film 21 demarcates a recess 24 recessed toward the bottom wall 15 of the trench 11 with the protruded portion 18 (divot 19). A bottom of the recess 24 is positioned on the bottom wall 15 side of the trench 11 with respect to the upper surface of the gate oxide film 21. The bottom of the recess 24 may be formed at a depth position between the first main surface 3 and the upper surface of the gate oxide film 21.

The gate electrode 22 is constituted of a conductive polysilicon. The gate electrode 22 is formed on the gate oxide film 21. The gate electrode 22 faces the device region 6 and the open end 16 of the trench 11 across the gate oxide film 21. The gate electrode 22 crosses the open end 16 of the trench 11 and fills the recess 24. In this embodiment, the gate electrode 22 extends in the <110> direction in a plan view and is orthogonal to the open end 16 of the trench 11.

Specifically, the gate electrode 22 includes a main body portion 25 and a lead-out portion 26. The main body portion 25 is formed as a film extending in a band shape along the gate oxide film 21 on the gate oxide film 21. That is, the main body portion 25 extends in the <110> direction in a plan view. The main body portion 25 crosses the first open end 16A and the second open end 16B and fills the recess 24. Thereby, the main body portion 25 faces the device region 6 and the open end 16 of the trench 11 across the gate oxide film 21.

The lead-out portion 26 is led out in a band shape from the main body portion 25 on the protruded portion 18 of the insulating embedded material 12. In this embodiment, the lead-out portion 26 is formed as a film extending in the <110> direction in a plan view. In this embodiment, the lead-out portion 26 includes a first lead-out portion 26A and a second lead-out portion 26B. The first lead-out portion 26A is led out on the insulating embedded material 12 by crossing the first open end 16A from the main body portion 25. The second lead-out portion 26B is led out on the insulating embedded material 12 by crossing the second open end 16B from the main body portion 25.

The sidewall structure 23 includes at least one of a silicon oxide film and a silicon nitride film. The sidewall structure 23 covers a sidewall of the gate electrode 22. Specifically, the sidewall structure 23 covers a sidewall of the main body portion 25 of the gate electrode 22 in the device region 6 and covers a sidewall of the lead-out portion 26 on the protruded portion 18 of the insulating embedded material 12.

The semiconductor device 1 includes a p-type well region 30 which is formed in the surface layer portion of the first main surface 3 in the device region 6. The presence or absence of the well region 30 is optional and may be removed if necessary. A p-type impurity concentration of the well region 30 is more than a p-type impurity concentration of the Si chip 2. In this embodiment, the well region 30 is formed in a region on the first main surface 3 side with respect to the bottom wall 15 of the trench 11 and is exposed from the inner sidewall 13 of the trench 11. The well region 30 may be formed deeper than the trench 11 and may cover the bottom wall 15 of the trench 11.

The semiconductor device 1 includes an n-type (second conductive type) drain region 31 which is formed in the surface layer portion of the first main surface 3 in the device region 6. Specifically, the drain region 31 is formed in a region on one side (in this embodiment, on the third open end 16C side of the trench 11) with respect to the planar gate structure 20 in a surface layer portion of the well region 30. The drain region 31 has a bottom which is positioned in a region on the first main surface 3 side with respect to a bottom of the well region 30.

In this embodiment, the drain region 31 includes a drain high concentration region 32 and a drain low concentration region 33. The drain low concentration region 33 has an n-type impurity concentration which is less than an n-type impurity concentration of the drain high concentration region 32. The drain high concentration region 32 is formed in a self-aligned manner with respect to the sidewall structure 23 and formed along the sidewall structure 23 in a plan view.

The drain low concentration region 33 is led out to the planar gate structure 20 side from the drain high concentration region 32 in the surface layer portion of the well region 30. The drain low concentration region 33 is formed on the first main surface 3 side with respect to a bottom of the drain high concentration region 32. The drain low concentration region 33 is formed in a self-aligned manner with respect to the gate electrode 22 and formed along the gate electrode 22 in a plan view. The drain low concentration region 33 may be provided or may not be provided and may be removed, if necessary.

The drain region 31 is formed such as to be exposed from the inner sidewall 13 of the trench 11. Specifically, the drain region 31 is exposed from the three inner sidewalls 13 which form the first open end 16A, the second open end 16B and the third open end 16C. The drain region 31 may be formed at intervals from at least the open ends 16 (first open end 16A and second open end 16B) where the gate electrode 22 has intersected in the trench 11.

The semiconductor device 1 includes an n-type source region 34 which is formed in the surface layer portion of the first main surface 3 in the device region 6. Specifically, the source region 34 is formed in a region on the other side (in this embodiment, on the fourth open end 16D side of the trench 11) with respect to the planar gate structure 20 in the surface layer portion of the well region 30 at an interval from the drain region 31. The source region 34 has a bottom which is positioned in a region on the first main surface 3 side with respect to the bottom of the well region 30.

In this embodiment, the source region 34 includes a source high concentration region 35 and a source low concentration region 36. The source low concentration region 36 has an n-type impurity concentration which is less than an n-type impurity concentration of the source high concentration region 35. The n-type impurity concentration of the source high concentration region 35 is equal to the n-type impurity concentration of the drain high concentration region 32. The n-type impurity concentration of the source low concentration region 36 is equal to the n-type impurity concentration of the drain low concentration region 33. That is, the source region 34 has an n-type impurity concentration which is equal to the n-type impurity concentration of the drain region 31.

The source high concentration region 35 is formed in a self-aligned manner with respect to the sidewall structure 23 and formed along the sidewall structure 23 in a plan view. The source low concentration region 36 is led out to the planar gate structure 20 side from the source high concentration region 35 in the surface layer portion of the well region 30.

The source low concentration region 36 is formed on the source high concentration region 35 side at an interval from the drain low concentration region 33. The source low concentration region 36 is formed on the first main surface 3 side with respect to a bottom of the source region 34. The source low concentration region 36 is formed in a self-aligned manner with respect to the gate electrode 22 and formed along the gate electrode 22 in a plan view. The source low concentration region 36 may be provided or may not be provided and may be removed, if necessary.

The source region 34 defines a channel 37 of the MOSFET 7 with the drain region 31 in a surface layer portion of the device region 6. Specifically, the channel 37 is defined in a portion which faces the gate electrode 22 across the gate oxide film 21 in the surface layer portion of the well region 30. The channel 37 forms a current path along the <110> direction between the drain region 31 and the source region 34.

The source region 34 is preferably formed at an interval from at least the open end 16 where the gate electrode 22 has intersected in the trench 11. In this embodiment, the source region 34 is formed at intervals from the first open end 16A and the second open end 16B and is exposed from the fourth open end 16D. With this structure, the formation of a subchannel is suppressed at the first open end 16A and the second open end 16B. As a matter of course, the source region 34 may be formed at intervals from all the open ends 16.

The semiconductor device 1 includes a gate silicide layer 38, a drain silicide layer 39 and a source silicide layer 40. The gate silicide layer 38 is constituted of a polycide layer which is integrally formed with the gate electrode 22 on a surface layer portion of the gate electrode 22. The drain silicide layer 39 is constituted of a silicide layer which is integrally formed with the Si chip 2 on a surface layer portion of the drain region 31. The source silicide layer 40 is constituted of a silicide layer which is integrally formed with the Si chip 2 on a surface layer portion of the source region 34.

The gate silicide layer 38, the drain silicide layer 39 and the source silicide layer 40 may each include at least one of TiSi, $TiSi_2$, NiSi, CoSi, $CoSi_2$, $MoSi_2$ and $WSi_2$.

The semiconductor device 1 includes an interlayer insulating film 41 which covers the first main surface 3. The interlayer insulating film 41 includes at least one of an oxide film ($SiO_2$ film) and a nitride film (SiN film). The interlayer insulating film 41 may have a single layer structure which is constituted of an oxide film or a nitride film. The interlayer insulating film 41 may have a laminated structure in which one or a plurality of oxide films and one or a plurality of nitride films are laminated in an arbitrary order. The interlayer insulating film 41 covers the trench insulating structure 10 and the planar gate structure 20 on the first main surface 3. Specifically, the interlayer insulating film 41 collectively covers the plurality of device regions 6 (refer to FIG. 4 as well) on the first main surface 3.

The semiconductor device 1 includes a gate contact electrode 42, a drain contact electrode 43 and a source contact electrode 44. The gate contact electrode 42 penetrates through the interlayer insulating film 41 and is electrically connected to the gate electrode 22. Specifically, the gate contact electrode 42 is electrically connected to the lead-out portion 26 of the gate electrode 22 and faces the insulating embedded material 12 across the lead-out portion 26. The drain contact electrode 43 penetrates through the interlayer insulating film 41 and is electrically connected to the drain region 31. The source contact electrode 44 penetrates through the interlayer insulating film 41 and is electrically connected to the source region 34.

The gate contact electrode 42, the drain contact electrode 43 and the source contact electrode 44 each have a laminated structure which includes a barrier electrode film 45 and a main electrode 46. The barrier electrode film 45 covers an inner wall surface of a contact hole 47 which is formed in the interlayer insulating film 41. The barrier electrode film 45 may have a single layer structure which is constituted of a Ti film or a TiN film. The barrier electrode film 45 may have a laminated structure which includes a Ti film and a TiN film laminated in an arbitrary order. The main electrode 46 is embedded in the contact hole 47 across the barrier electrode film 45. The main electrode 46 may contain at least one of copper and tungsten.

The semiconductor device 1 includes a gate wiring 48, a drain wiring 49 and a source wiring 50 which are formed on the interlayer insulating film 41. The gate wiring 48 is electrically connected to the gate contact electrode 42. The drain wiring 49 is electrically connected to the drain contact electrode 43. The source wiring 50 is electrically connected to the source contact electrode 44.

The gate wiring 48, the drain wiring 49 and the source wiring 50 each have a laminated structure which includes a first barrier wiring film 51, a main wiring film 52 and a second barrier wiring film 53 laminated in this order from the interlayer insulating film 41 side. The first barrier wiring film 51 and the second barrier wiring film 53 may each have a single layer structure which is constituted of a Ti film or a TiN film. The first barrier wiring film 51 and the second barrier wiring film 53 may each have a laminated structure which includes a Ti film and a TiN film laminated in an arbitrary order. The main wiring film 52 may include at least one of an Al film, an AlSiCu alloy film, an AlSi alloy film and an AlCu alloy film.

Figure 9:
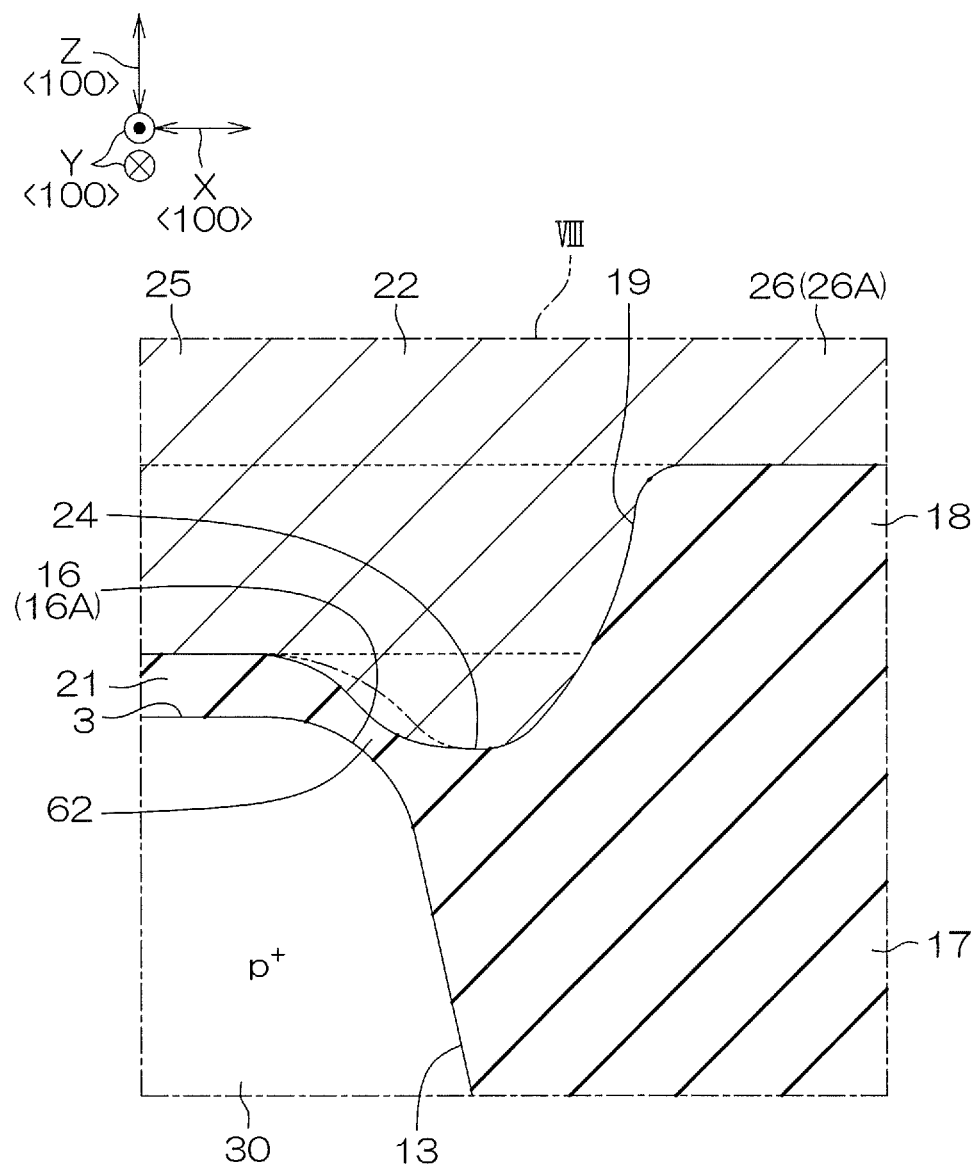
FIG. 9 is a drawing which corresponds to FIG. 8 and is an enlarged view for describing a semiconductor device according to a comparative example.

FIG. 9 is a drawing which corresponds to FIG. 8 and is an enlarged view for describing a structure of a semiconductor device 61 according to a comparative example. The semiconductor device 61 according to the comparative example has the same structure as the semiconductor device 1 except that an open end 16 of a trench 11 extends in a <100> direction. In FIG. 9, a structure which corresponds to the structure described for the semiconductor device 1 is given the same reference signs, and a description thereof will be omitted.

A growth rate of the gate oxide film 21 at the open end 16 of the trench 11 varies depending on a crystal orientation of an Si monocrystal which constitutes the open end 16 of the trench 11. Specifically, the growth rate of the gate oxide film 21 decreases as a direction in which the open end 16 of the trench 11 extends comes close to the <100> direction of the Si monocrystal from the <110> direction of the Si monocrystal.

In contrast thereto, the growth rate of the gate oxide film 21 increases as the direction in which the open end 16 of the trench 11 extends comes close to the <110> direction of the Si monocrystal from the <100> direction of the Si monocrystal. The growth rate of the gate oxide film 21 becomes the highest when the direction in which the open end 16 of the trench 11 extends set to the <110> direction of the Si monocrystal.

In the case of the semiconductor device 61 according to the comparative example, an open end 16 of a trench 11 extends in the <100> direction. Therefore, an insufficiently grown thin film portion 62 is formed at a portion where a gate oxide film 21 covers the open end 16 of the trench 11. The thin film portion 62 of the gate oxide film 21 has a thickness less than a thickness of a portion where the gate oxide film 21 covers a device region 6.

On the other hand, a gate electrode 22 faces the open end 16 of the trench 11 across the thin film portion 62 of the gate oxide film 21. Therefore, the semiconductor device 61 according to the comparative example has a structure in which a sub-channel is easily formed at the open end 16 of the trench 11 due to the thin film portion 62 of the gate oxide film 21 in the sub-threshold characteristics in which a gate voltage is less than a threshold voltage. That is, in the semiconductor device 61 according to the comparative example, the sub-channel is turned on in advance when the gate voltage is less than the threshold voltage, and the channel 37 is turned on when the gate voltage becomes equal to or higher than the threshold voltage.

Figure 10:
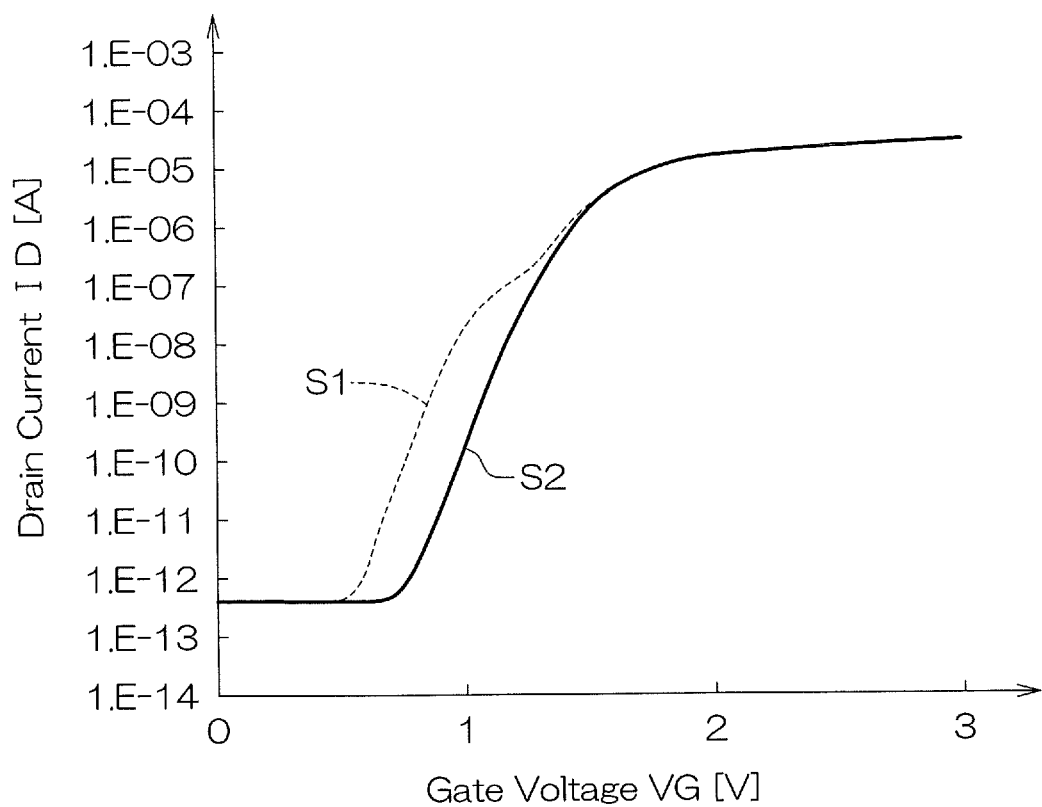
FIG. 10 is a graph which shows sub-threshold characteristics of a MOSFET.

FIG. 10 is a graph which shows the sub-threshold characteristics of a MOSFET 7. The vertical axis indicates a drain current ID [A], and the horizontal axis indicates a gate voltage VG [V]. The graph of FIG. 10 shows first characteristics S1 (refer to the dashed line) and second characteristics S2 (refer to the solid line). The first characteristics S1 show current voltage characteristics of the MOSFET 7 of the semiconductor device 61 according to the comparative example. The second characteristics S2 show current voltage characteristics of the MOSFET 7 according to the semiconductor device 1.

With reference to the first characteristics S1, the MOSFET 7 of the semiconductor device 61 according to the comparative example has a hump in the sub-threshold characteristics. In contrast thereto, with reference to the second characteristics S2, the MOSFET 7 according to the semiconductor device 1 suppresses a hump in the sub-threshold characteristics.

As described above, the semiconductor device 1 includes the Si chip 2, the trench 11 and the gate oxide film 21. The Si chip 2 has the first main surface 3 which faces the {100} plane of the Si monocrystal. The trench 11 is formed on the first main surface 3 and has the open end 16 extending inclined in the <110> direction side of the Si monocrystal with respect to the <100> direction of the Si monocrystal in a plan view. The gate oxide film 21 covers the first main surface 3 and the open end 16 of the trench 11.

According to the semiconductor device 1, the trench 11 which has the open end 16 extending inclined in the <110> direction side with respect to the <100> direction is formed. Thereby, it is possible to enhance a growth rate of the gate oxide film 21 at the open end 16 of the trench 11 and also to suppress thinning of the gate oxide film 21 at the open end 16. As a result, it is possible to suppress a hump in the sub-threshold characteristics.

The open end 16 of the trench 11 preferably has an inclination angle θ which is more than 0° and not more than 45° with respect to the <100> direction in a plan view. The inclination angle θ is preferably not less than 40° and not more than 45°. The inclination angle θ is in particularly preferably not less than 44° and not more than 45°. The open end 16 of the trench 11 preferably extends in the <110> direction. According to these structures, it is possible to appropriately suppress thinning of the gate oxide film 21 at the open end 16 of the trench 11.

Figure 11:
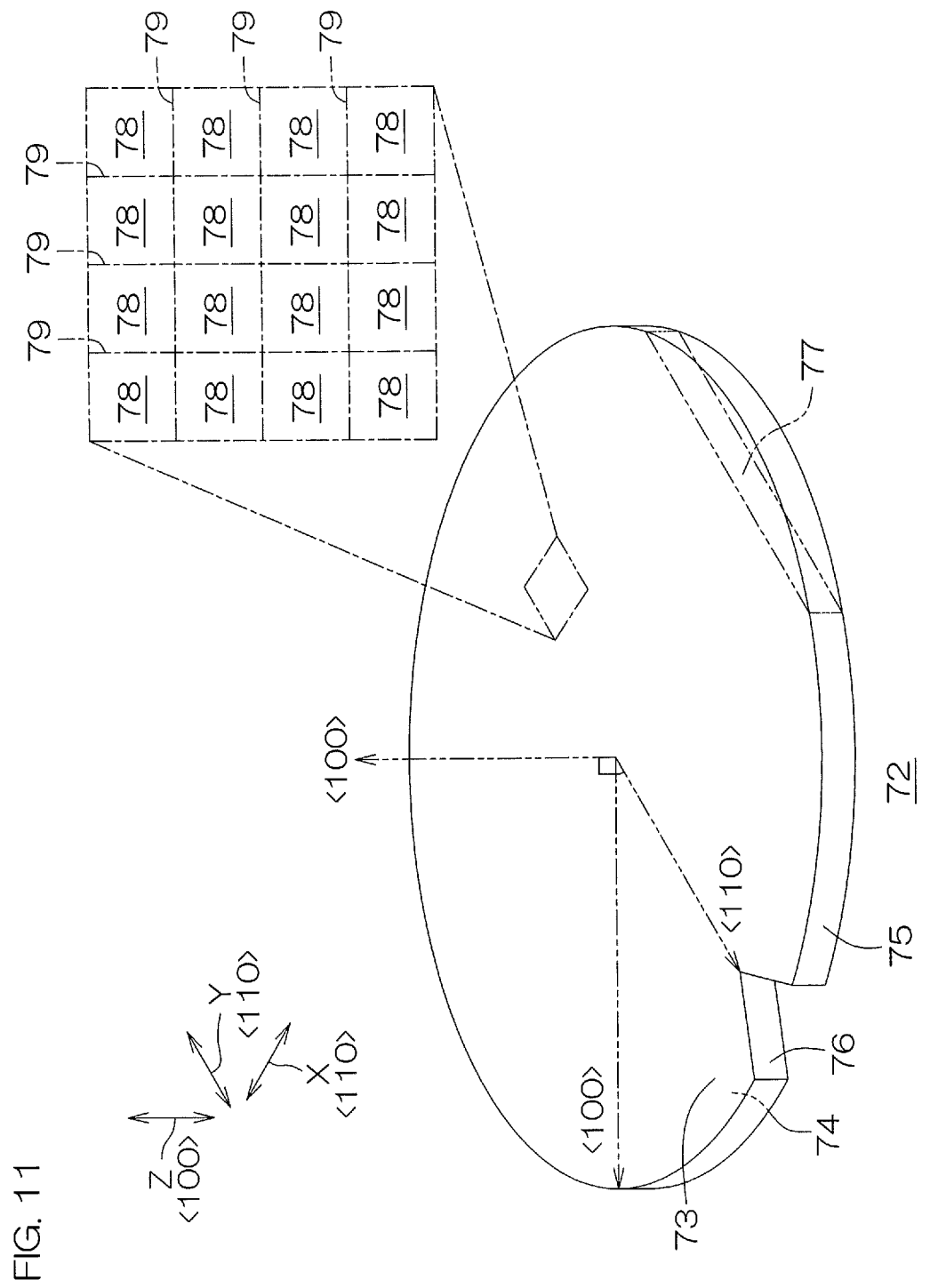
FIG. 11 is a perspective view which shows an Si wafer.

FIG. 11 is a perspective view which shows an Si wafer 72. In the method for manufacturing the semiconductor device 1, the Si wafer 72 which is constituted of an Si monocrystal is used. The Si wafer 72 serves as a base of the Si chip 2. The Si wafer 72 has a first wafer main surface 73 on one side, a second wafer main surface 74 on the other side and a wafer sidewall 75 which connects the first wafer main surface 73 and the second wafer main surface 74. The first wafer main surface 73 and the second wafer main surface 74 each face the {100} plane of the Si monocrystal. The first wafer main surface 73 and the second wafer main surface 74 respectively correspond to the first main surface 3 and the second main surface 4 of the Si chip 2.

The wafer sidewall 75 has an orientation notch 76 as an example of a marker indicating the crystal orientation of the Si monocrystal. The orientation notch 76 is constituted of a triangular notch which is recessed toward a central portion of the Si wafer 72. In this embodiment, the orientation notch 76 is recessed toward the <110> direction and indicates the <110> direction. A direction toward the central portion of the Si wafer 72 from a position shifted by 45° in a circumferential direction from the orientation notch 76 is the <100> direction.

The orientation notch 76 is not necessarily required to indicate the <110> direction but it may indicate the <100> direction. In this case, a direction toward the central portion of the Si wafer 72 from a position shifted by 45° in a circumferential direction from the orientation notch 76 is the <110> direction. The Si wafer 72 may have an orientation flat 77 (refer to the alternate long and two short dashed line) in place of the orientation notch 76. The orientation flat 77 may extend along the <110> direction and indicate the <110> direction. The orientation flat 77 may extend along the <100> direction and indicate the <100> direction.

A plurality of device forming regions 78 each of which corresponds to the semiconductor device 1, and a plurality of intended cutting lines 79 for demarcating the plurality of device forming regions 78 are set in the Si wafer 72. The plurality of device forming regions 78 are set in a matrix arranged along two <110> directions (that is, the first direction X and the second direction Y) which are orthogonal to each other. The plurality of intended cutting lines 79 are set in a lattice extending along the two <110> directions which are orthogonal to each other.

Figure 12C:
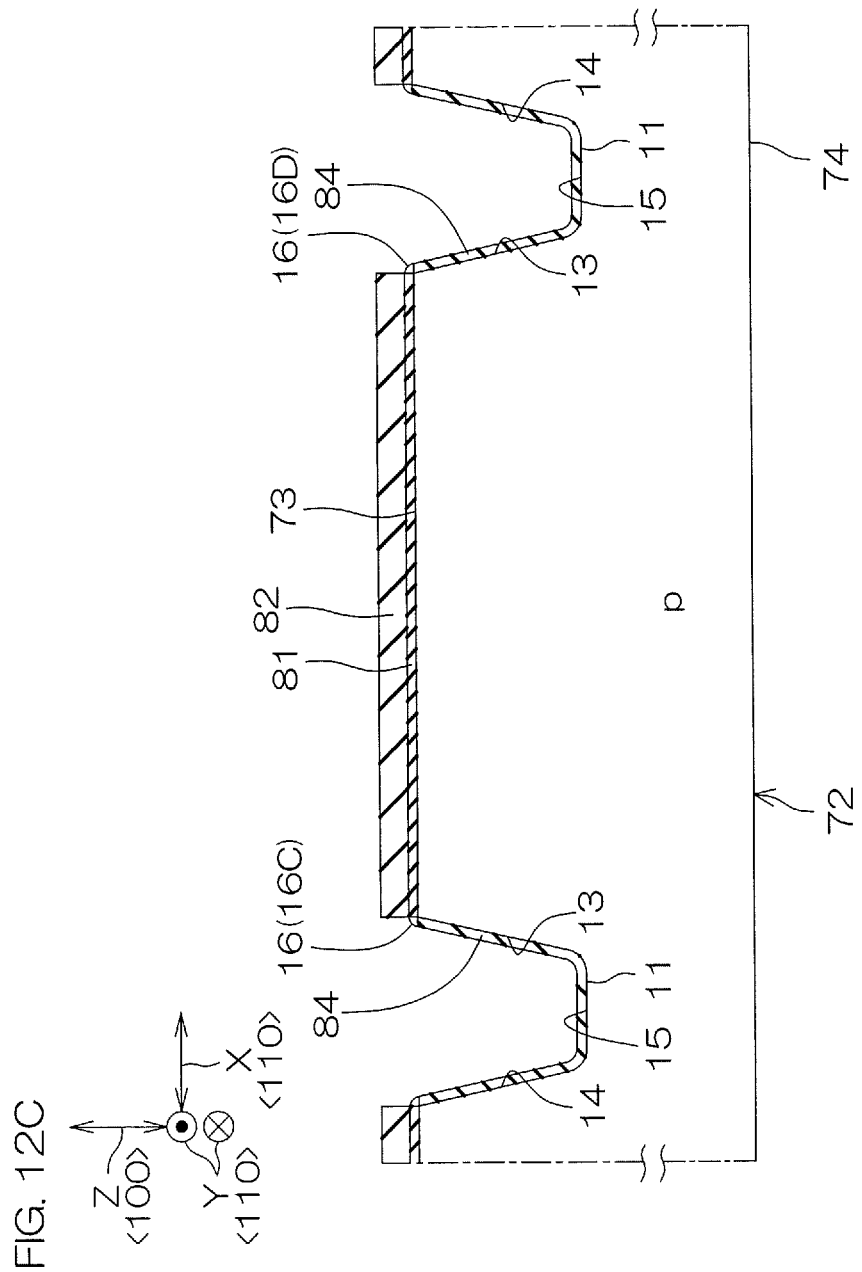
FIG. 12C is a cross-sectional view which shows a step subsequent to that of FIG. 12B.
Figure 12D:
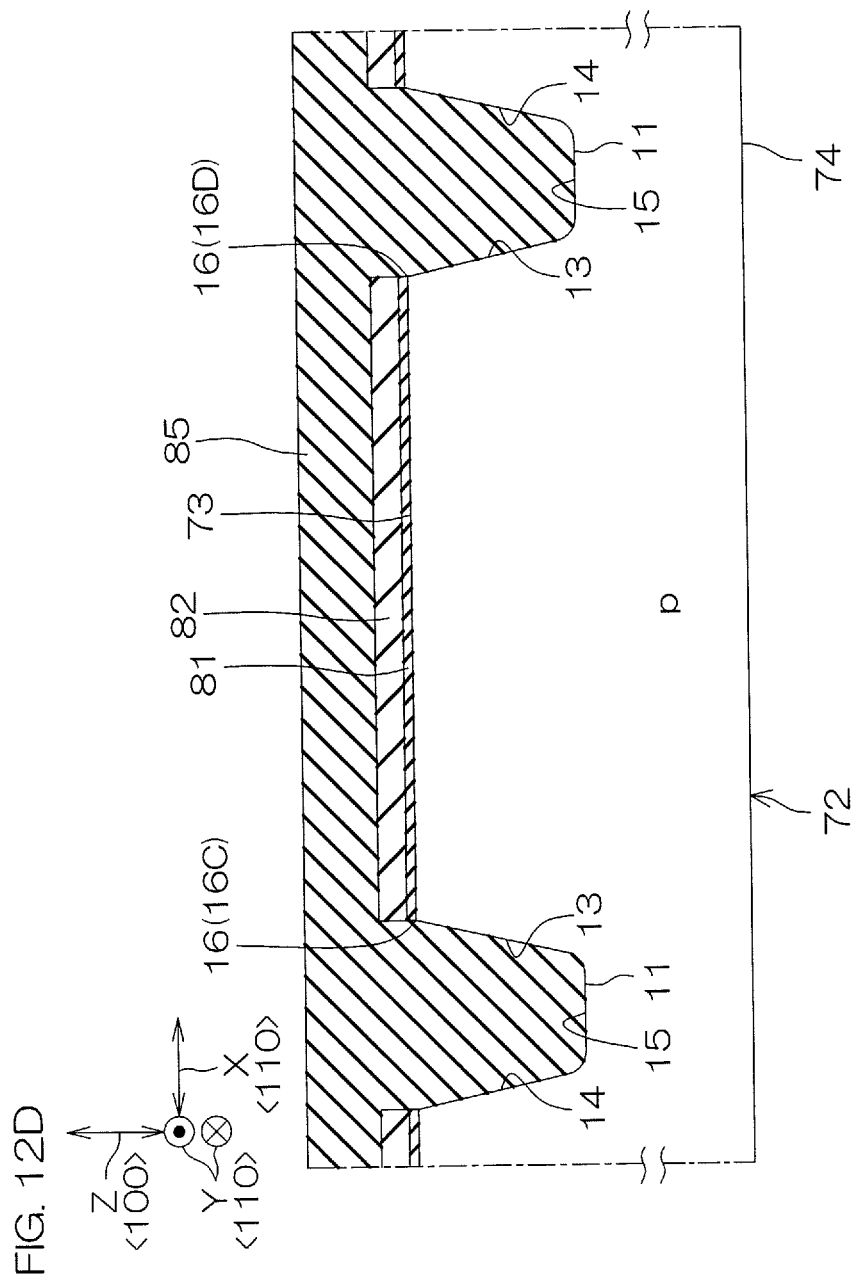
FIG. 12D is a cross-sectional view which shows a step subsequent to that of FIG. 12C.
Figure 12F:
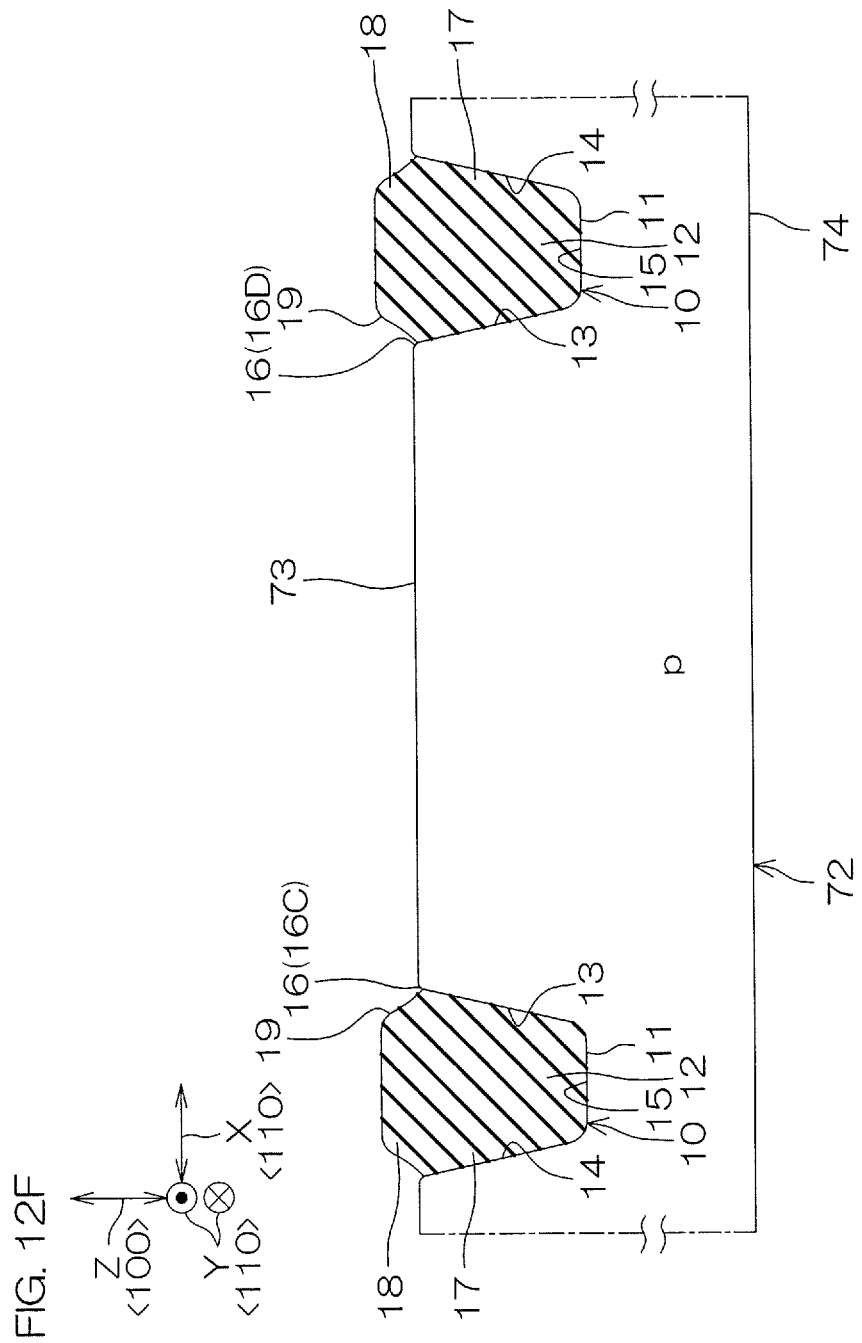
FIG. 12F is a cross-sectional view which shows a step subsequent to that of FIG. 12E.
Figure 12L:
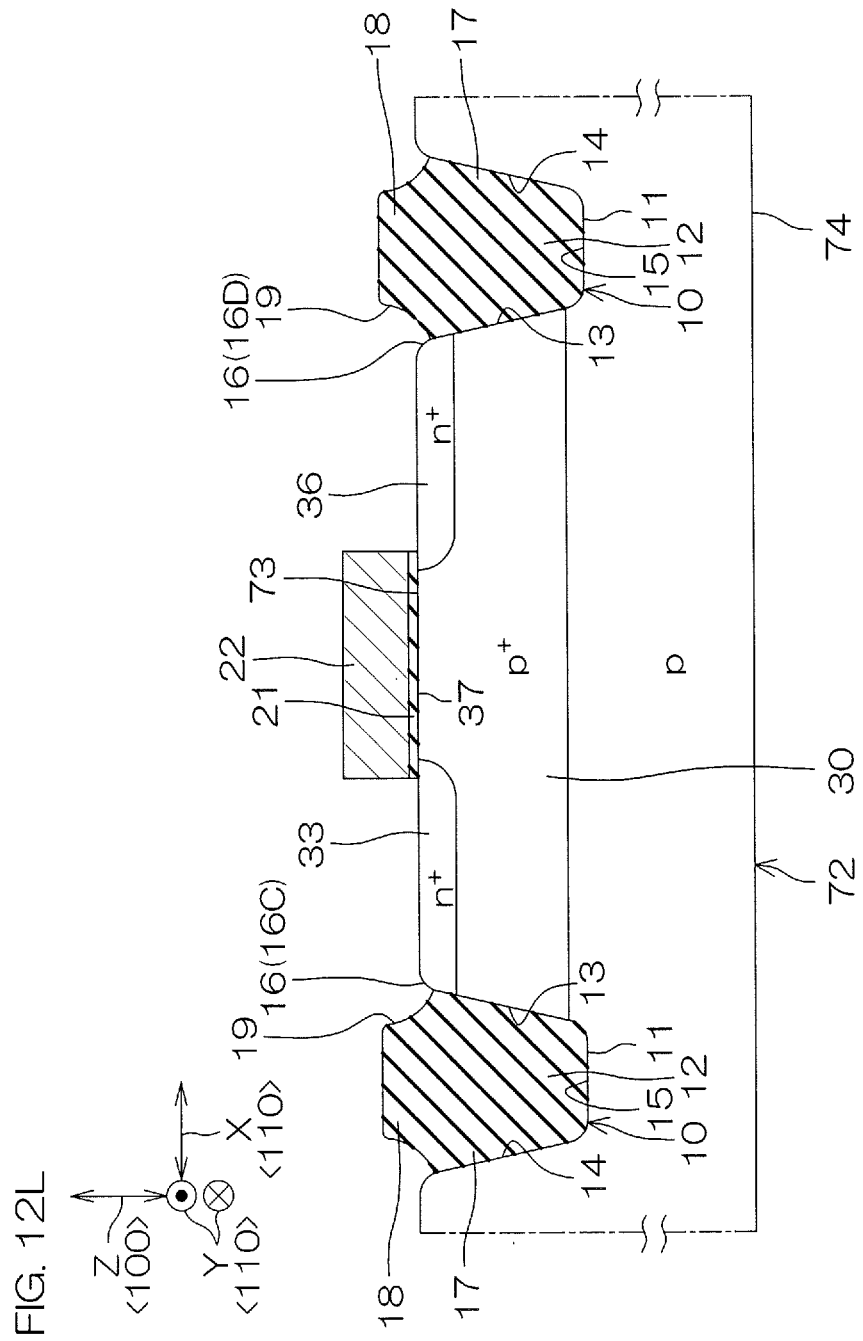
FIG. 12L is a cross-sectional view which shows a step subsequent to that of FIG. 12K.
Figure 12N:
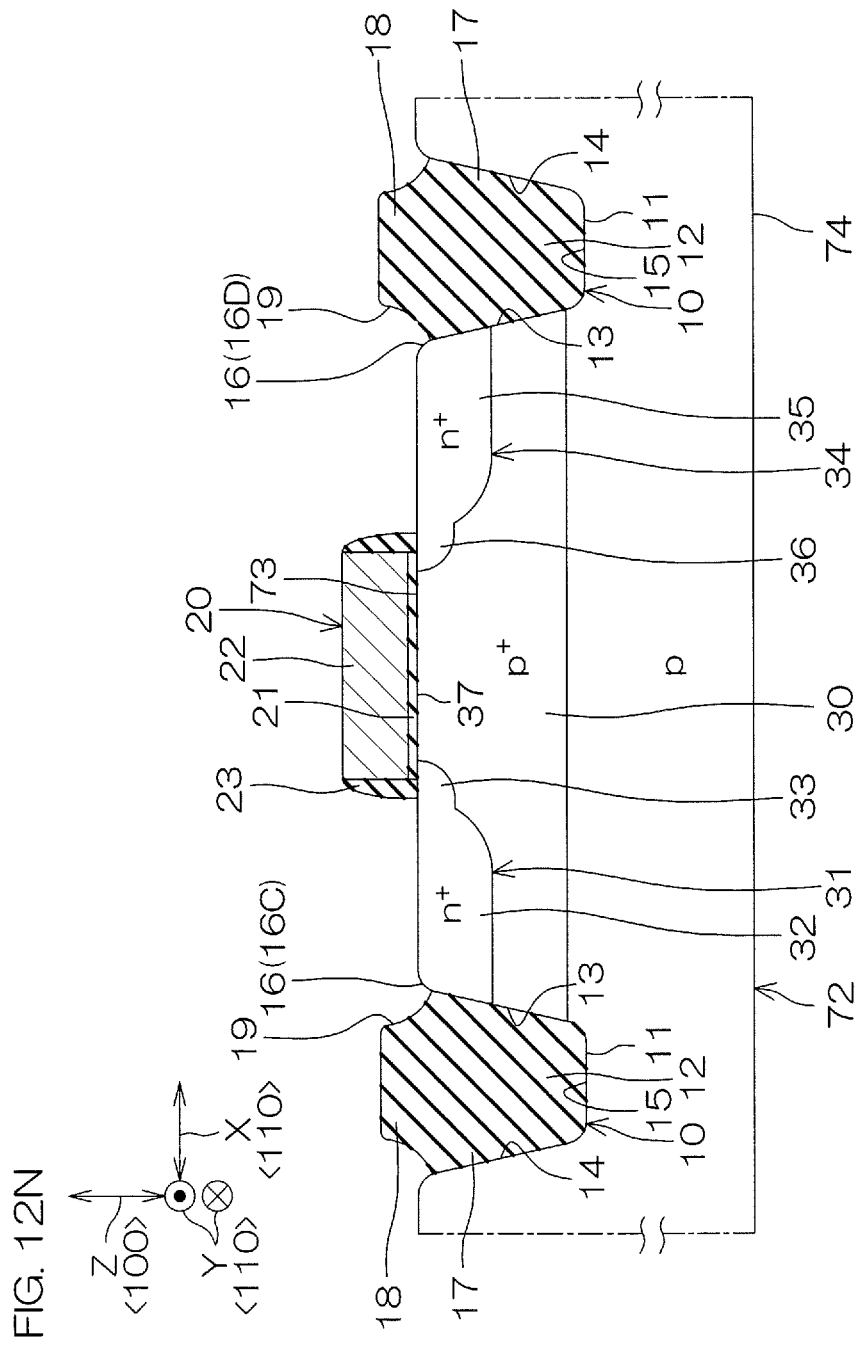
FIG. 12N is a cross-sectional view which shows a step subsequent to that of FIG. 12M.
Figure 12O:
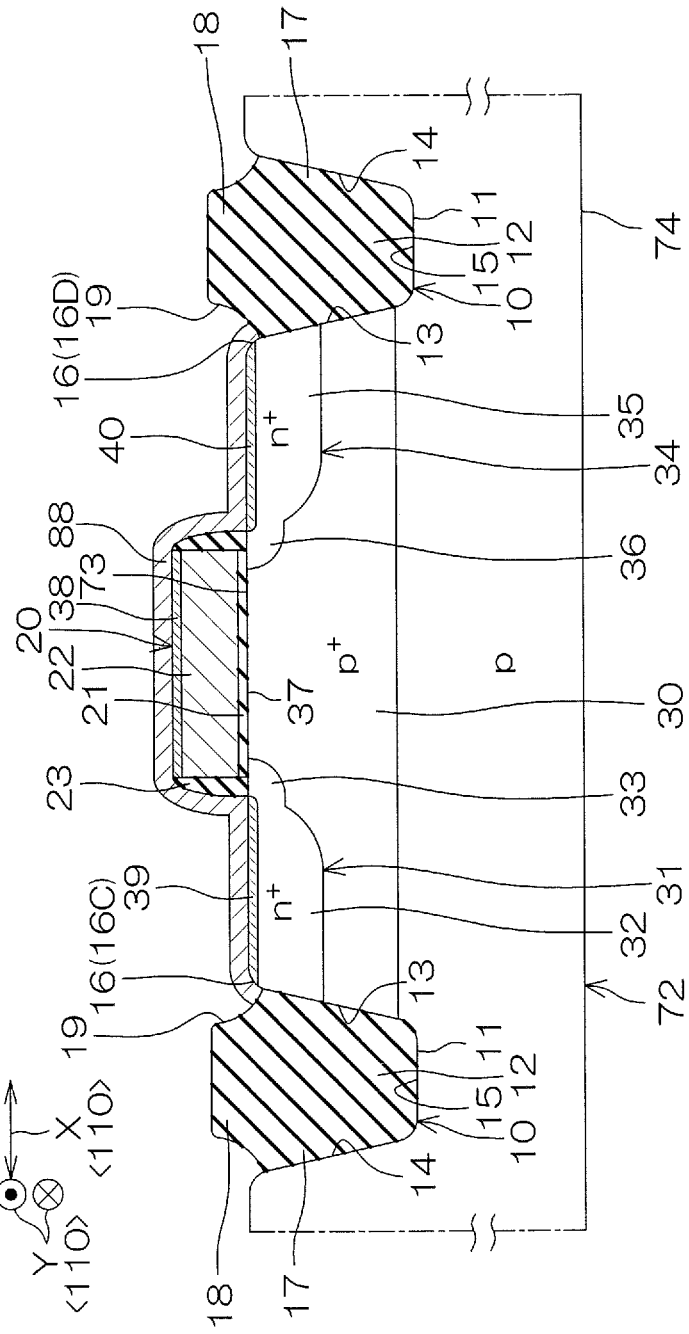
FIG. 12O is a cross-sectional view which shows a step subsequent to that of FIG. 12N.
Figure 12P:
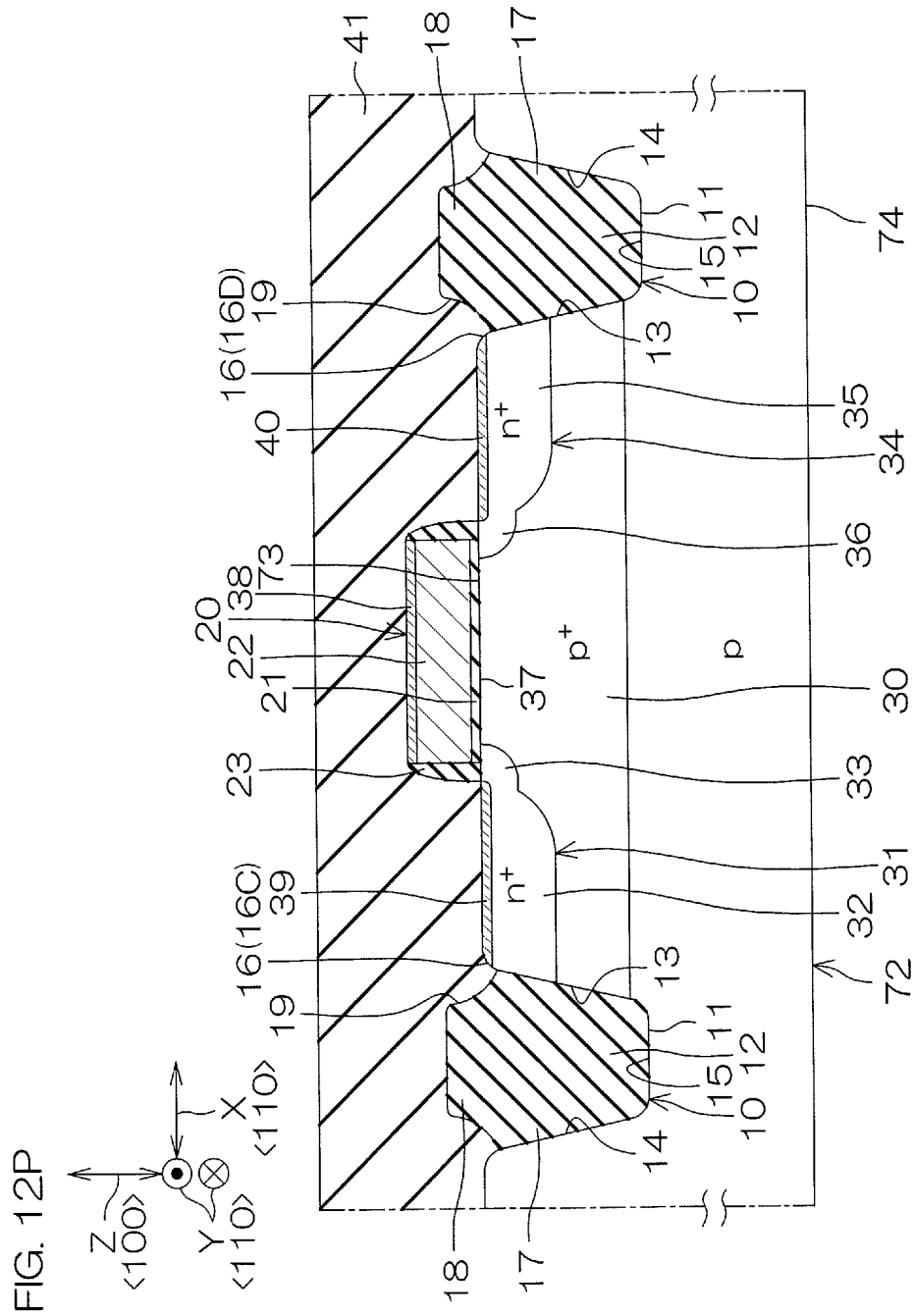
FIG. 12P is a cross-sectional view which shows a step subsequent to that of FIG. 12O.
Figure 12Q:
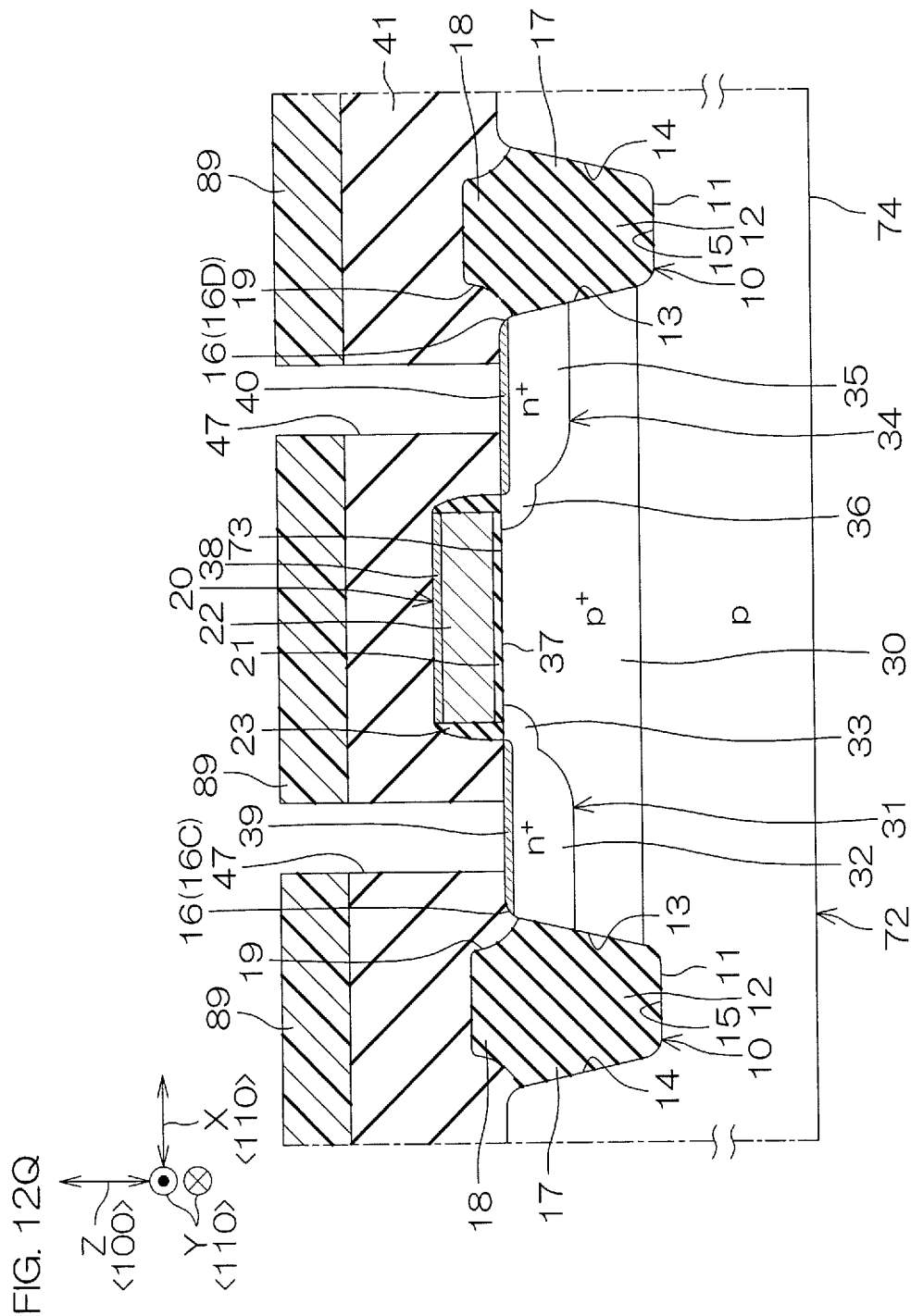
FIG. 12Q is a cross-sectional view which shows a step subsequent to that of FIG. 12P.
Figure 12R:
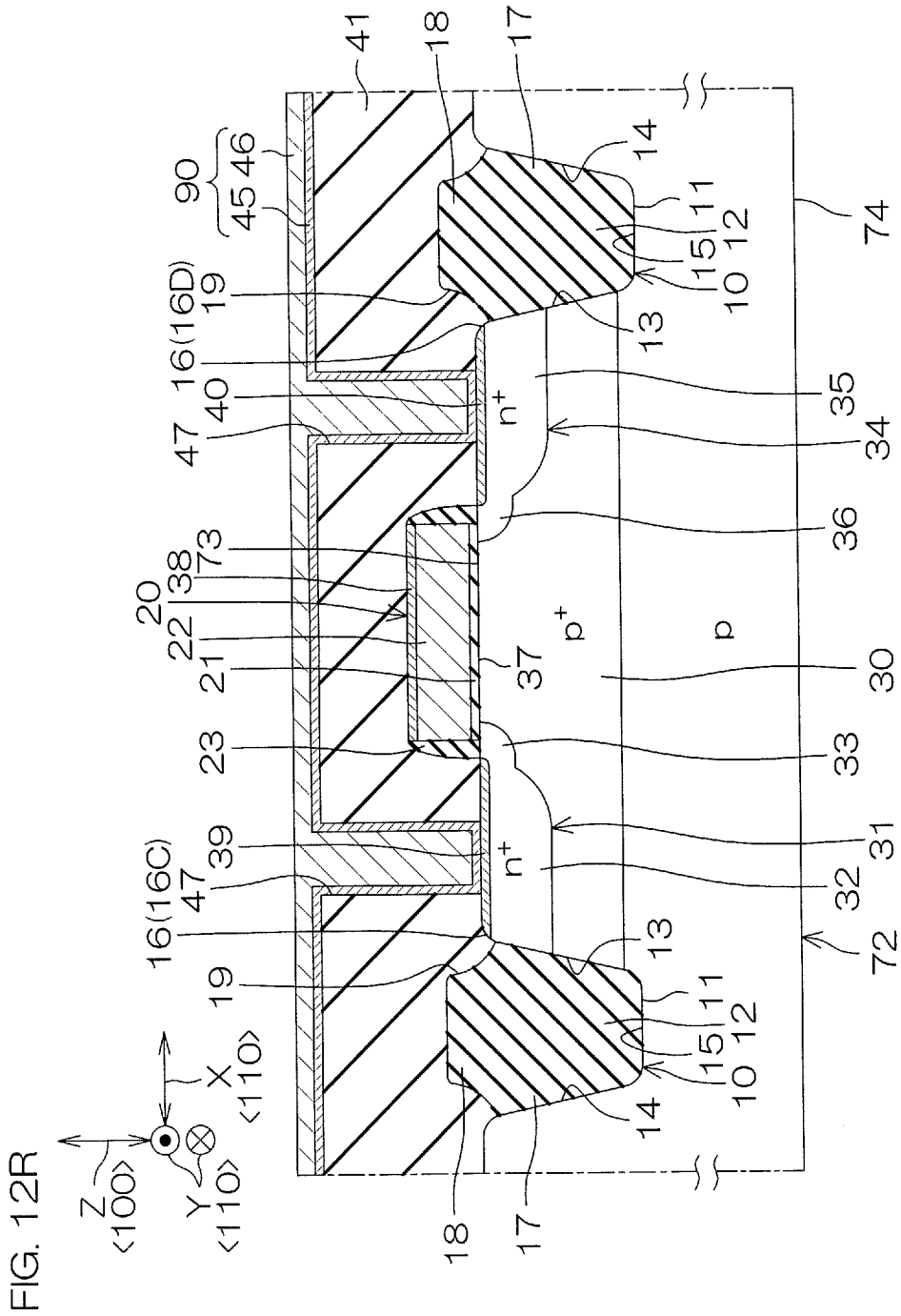
FIG. 12R is a cross-sectional view which shows a step subsequent to that of FIG. 12Q.
Figure 12S:
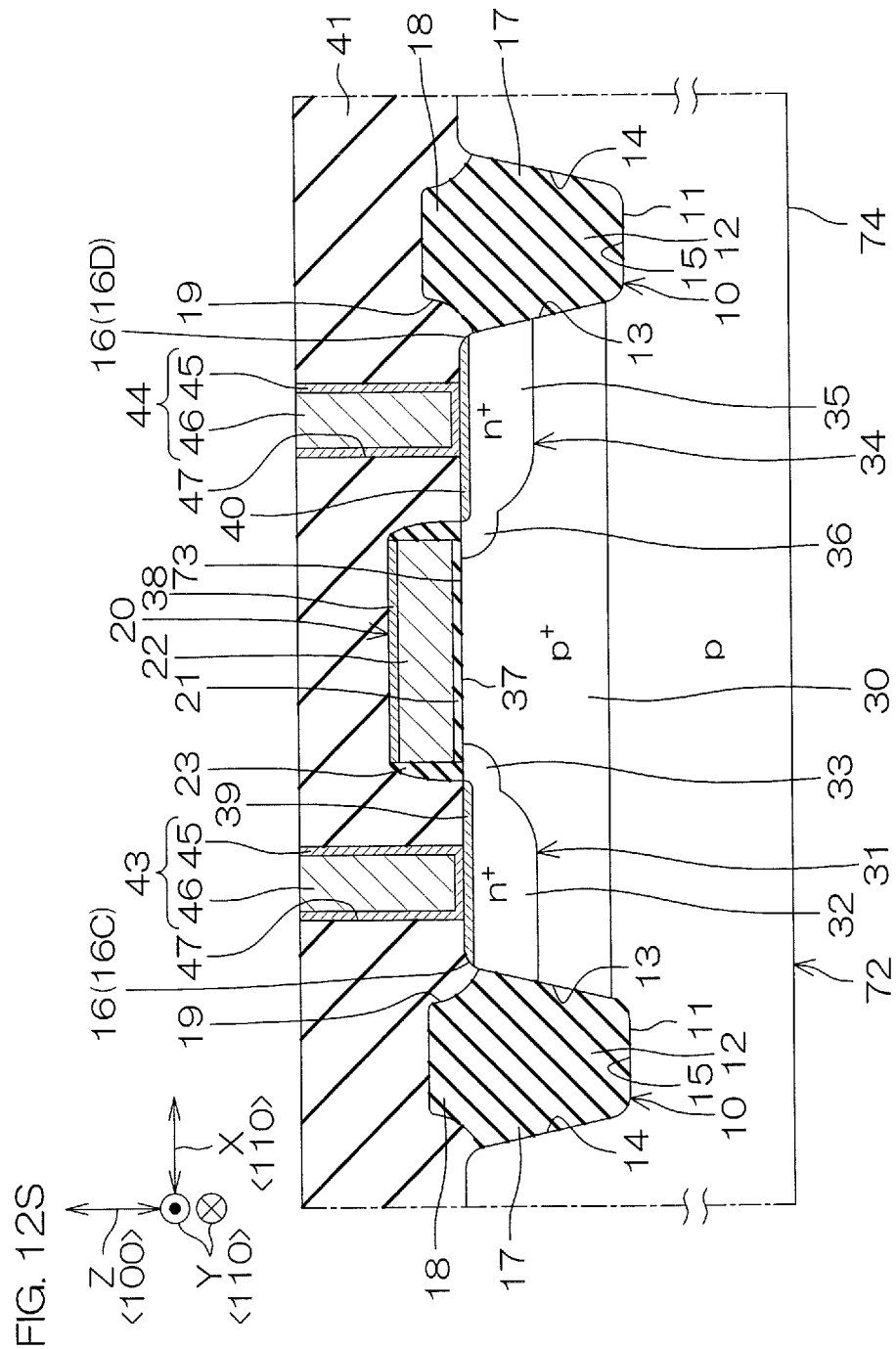
FIG. 12S is a cross-sectional view which shows a step subsequent to that of FIG. 12R.
Figure 12T:
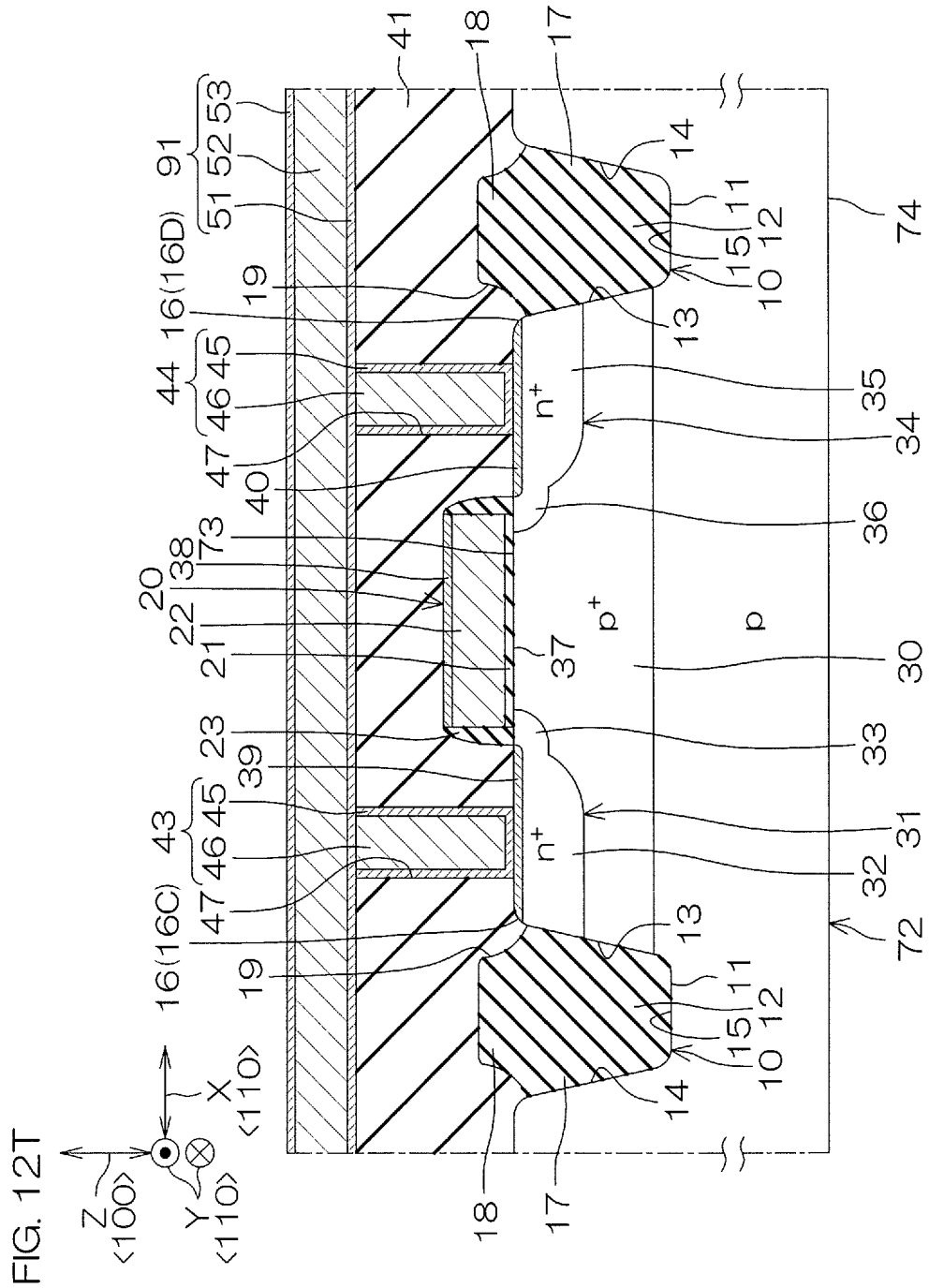
FIG. 12T is a cross-sectional view which shows a step subsequent to that of FIG. 12S.
Figure 12U:
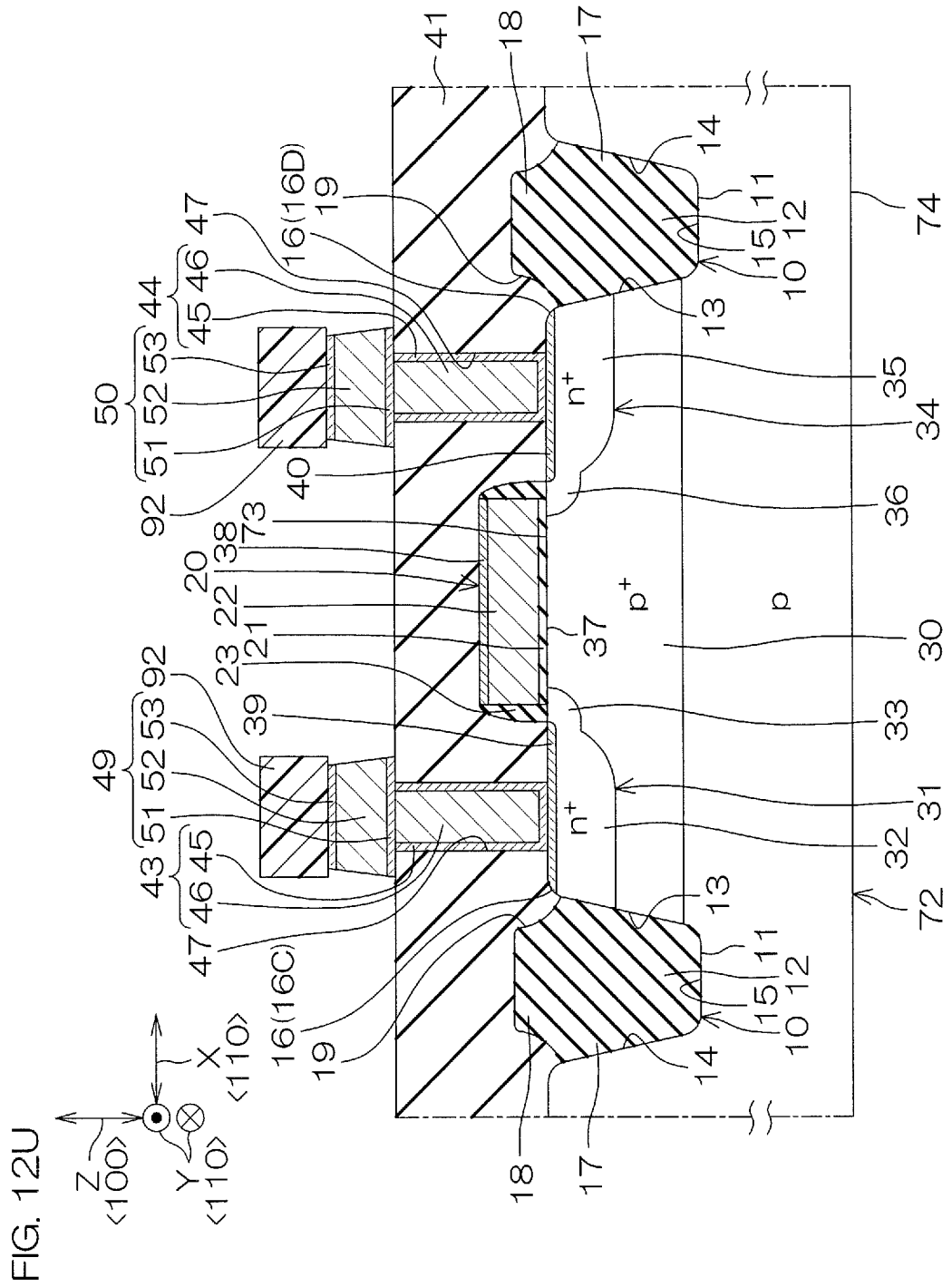
FIG. 12U is a cross-sectional view which shows a step subsequent to that of FIG. 12T.

FIG. 12A to FIG. 12U are each across-sectional view for describing one example of the method for manufacturing the semiconductor device 1 shown in FIG. 4. FIG. 12A to FIG. 12U are each a cross-sectional view of the region corresponding to FIG. 6. FIG. 12A to FIG. 12U show only a method for manufacturing the device region 6 in which the MOSFET 7 is formed.

First, with reference to FIG. 12A, the Si wafer 72 is prepared. Next, a buffer oxide film 81 is formed on the first wafer main surface 73. The buffer oxide film 81 is constituted of a silicon oxide. The buffer oxide film 81 may be formed by a CVD (chemical vapor deposition) method or an oxidation treatment method (for example, thermal oxidation treatment method). The buffer oxide film 81 may have a thickness of not less than 5 nm and not more than 50 nm.

Next, a raised insulating film 82 is formed on the buffer oxide film 81. The raised insulating film 82 is constituted of an insulator different from the buffer oxide film 81. The raised insulating film 82 is preferably constituted of a nitride film (SiN film). The raised insulating film 82 may have a thickness of not less than 50 nm and not more than 200 nm. The raised insulating film 82 may be formed by a CVD method.

Next, a resist mask 83 which has a predetermined pattern is formed on the raised insulating film 82. The resist mask 83 exposes a region where the trench 11 is to be formed in the raised insulating film 82 and covers other regions. Next, an unnecessary portion of the raised insulating film 82 is removed by an etching method via the resist mask 83. The etching method may be a dry etching method (for example, RIE (reactive ion etching) method) and/or a wet etching method. Thereby, an opening which has a pattern corresponding to the trench 11 is formed in the raised insulating film 82. The resist mask 83 is removed thereafter.

Next, with reference to FIG. 12B, an unnecessary portion of the buffer oxide film 81 is removed by an etching method in which the raised insulating film 82 is used as a mask. The etching method may be a dry etching method (for example, RIE method) and/or a wet etching method. Thereby, an opening which has a pattern corresponding to the trench 11 is formed in the buffer oxide film 81.

Next, an unnecessary portion of the first wafer main surface 73 is removed by an etching method in which the buffer oxide film 81 and the raised insulating film 82 are used as a mask. The etching method may be a dry etching method (for example, RIE method) and/or a wet etching method. The etching method is preferably a dry etching method (for example, RIE method).

Thereby, the trench 11 which demarcates the device region 6 is formed in the first wafer main surface 73. The trench 11 is preferably formed along a direction in which the plurality of intended cutting lines 79 extend. In this case, it is possible to easily form the trench 11 which has the open end 16 extending inclined in the <110> direction side with respect to the <100> direction in a plan view. A specific description of the trench 11 is as per described previously and, therefore, omitted here.

Next, with reference to FIG. 12C, a liner oxide film 84 is formed on an inner wall surface of the trench 11. The liner oxide film 84 may be formed by an oxidation treatment method (for example, thermal oxidation treatment method). The liner oxide film 84 may have a thickness of not less than 5 nm and not more than 50 nm.

Next, with reference to FIG. 12D, a base insulating film 85 which serves as a base of the insulating embedded material 12 is formed on the first wafer main surface 73. In this embodiment, the base insulating film 85 is constituted of a silicon oxide. The base insulating film 85 may be formed by a CVD method. The base insulating film 85 fills the trench 11 and covers the buffer oxide film 81 and the raised insulating film 82. The base insulating film 85 is integrally formed with the liner oxide film 84 inside the trench 11. The base insulating film 85 may be embedded into the trench 11 in a manner that a boundary with the liner oxide film 84 has disappeared. The base insulating film 85 may be embedded into the trench 11 in a manner that the boundary with the liner oxide film 84 remains.

Next, with reference to FIG. 12E, an unnecessary portion of the base insulating film 85 is removed by an etching method. The base insulating film 85 is removed until the raised insulating film 82 is exposed. The etching method may be a dry etching method (for example, RIE method) and/or a wet etching method. Thereby, the insulating embedded material 12 which has the embedded portion 17 positioned inside the trench 11 and the protruded portion 18 positioned outside the trench 11 is formed.

Next, with reference to FIG. 12F, the raised insulating film 82 is removed by an etching method. The raised insulating film 82 is removed until the buffer oxide film 81 is exposed. The etching method may be a dry etching method (for example, RIE method) and/or a wet etching method. Next, the buffer oxide film 81 is removed by an etching method. The buffer oxide film 81 is removed until the first wafer main surface 73 is exposed. The etching method may be a dry etching method (for example, RIE method) and/or a wet etching method.

In this step, a part of the insulating embedded material 12 (specifically, protruded portion 18) is removed together with the raised insulating film 82 and the buffer oxide film 81. As a result, the notched divot 19 recessed toward the bottom wall 15 of the trench 11 is formed at a peripheral edge of the protruded portion 18. The protruded portion 18 is formed by the divot 19 in a tapered shape (trapezoidal shape in a cross-sectional view) toward a direction away from the trench 11 and exposes the open end 16 of the trench 11.

Next, with reference to FIG. 12G, a sacrificial oxide film 86 is formed on the first wafer main surface 73 in the device region 6. The sacrificial oxide film 86 covers the first wafer main surface 73 and the open end 16 of the trench 11. The sacrificial oxide film 86 is constituted of a silicon oxide. The sacrificial oxide film 86 may be formed by a CVD method or an oxidation treatment method. The sacrificial oxide film 86 is preferably formed by a thermal oxidation treatment method. The sacrificial oxide film 86 may have a thickness of not less than 5 nm and not more than 50 nm.

Next, the p-type well region 30 is formed in a surface layer portion of the first wafer main surface 73 in the device region 6. The well region 30 is formed by introducing p-type impurities into the surface layer portion of the first wafer main surface 73 by an ion implantation method via the sacrificial oxide film 86.

Next, with reference to FIG. 12H, the sacrificial oxide film 86 is removed by an etching method. The sacrificial oxide film 86 is removed until the first wafer main surface 73 is exposed. The etching method may be a dry etching method (for example, RIE method) and/or a wet etching method. In this step, a part of the insulating embedded material 12 (specifically, protruded portion 18) is removed together with the sacrificial oxide film 86. As a result, the divot 19 of the insulating embedded material 12 is further expanded. Further, in this step, the open end 16 of the trench 11 is formed in a curved shape in association with removal of the sacrificial oxide film 86.

Next, with reference to FIG. 12I, the gate oxide film 21 is formed on the first wafer main surface 73 in the device region 6. The gate oxide film 21 is constituted of an oxide of the first wafer main surface 73. The gate oxide film 21 is formed by oxidizing the first wafer main surface 73 and the surface layer portion of the first wafer main surface 73 in a film state by an oxidation treatment method. Specifically, the gate oxide film 21 is formed by a thermal oxidation treatment method.

According to the oxidation treatment method (thermal oxidation treatment method), a silicon oxide film (silicon thermal oxide film) which is integrally formed with the Si wafer 72 (first wafer main surface 73) is formed on the first wafer main surface 73 and the surface layer portion of the first wafer main surface 73. The gate oxide film 21 is formed as a curved film along the open end 16 of the trench 11. The gate oxide film 21 may have a thickness of not less than 1 nm and not more than 100 nm. The gate oxide film 21 is integrally formed with the insulating embedded material 12 inside the trench 11.

The trench 11 has the open end 16 extending inclined in the <110> direction side with respect to the <100> direction. The open end 16 of the trench 11 preferably has an inclination angle θ which is more than 0° and not more than 45° with respect to the <100> direction in a plan view. The inclination angle θ is preferably not less than 40° and not more than 45°. The inclination angle θ is in particularly preferably not less than 44° and not more than 45°. In this embodiment, the open end 16 of the trench 11 extends in the <110> direction. Thereby, it is possible to suppress thinning of the gate oxide film 21 at the open end 16 of the trench 11.

Next, with reference to FIG. 12J, the gate electrode 22 is formed on the first wafer main surface 73 such as to cover the gate oxide film 21 and the insulating embedded material 12. In this embodiment, the gate electrode 22 is constituted of a conductive polysilicon. The gate electrode 22 may be formed by a CVD method.

Next, with reference to FIG. 12K, a resist mask 87 having a predetermined pattern is formed on the gate electrode 22. The resist mask 87 exposes an unnecessary portion of the gate electrode 22 and covers the other regions. Next, the unnecessary portion of the gate electrode 22 is removed by an etching method via the resist mask 87. The etching method may be a dry etching method (for example, RIE method) and/or a wet etching method. Thereby, the gate electrode 22 is formed.

Next, an unnecessary portion of the gate oxide film 21 is removed by an etching method via the resist mask 87 and the gate electrode 22. The etching method may be a dry etching method (for example, RIE method) and/or a wet etching method. Thereby, the planar gate structure 20 which includes the gate oxide film 21 and the gate electrode 22 is formed. A specific description of the gate oxide film 21 is as per described previously and, therefore, omitted here. The resist mask 87 is removed thereafter.

Next, with reference to FIG. 12L, the n-type drain low concentration region 33 and the n-type source low concentration region 36 are formed in the surface layer portion of the well region 30. The drain low concentration region 33 and the source low concentration region 36 are each formed by introducing n-type impurities into the surface layer portion of the well region 30 by an ion implantation method in which the gate electrode 22 is used as a mask. That is, the drain low concentration region 33 and the source low concentration region 36 are each formed in a self-aligned manner with respect to the gate electrode 22.

Next, with reference to FIG. 12M, the sidewall structure 23 which covers the sidewall of the gate electrode 22 is formed. The sidewall structure 23 contains at least one of a silicon oxide and a silicon nitride. After formation of an insulating film (not shown) by a CVD method, the sidewall structure 23 is formed by removing the insulating film by an etching method in such a manner that a portion which covers the sidewall of the gate electrode 22 is allowed to remain. That is, the sidewall structure 23 is formed in a self-aligned manner with respect to the gate electrode 22. The etching method may be a dry etching method (for example, RIE method).

Next, with reference to FIG. 12N, the n-type drain high concentration region 32 and the n-type source high concentration region 35 are formed in the surface layer portion of the well region 30. The drain high concentration region 32 and the source high concentration region 35 are each formed by introducing n-type impurities into the surface layer portion of the well region 30 by an ion implantation method in which the gate electrode 22 and the sidewall structure 23 are used as a mask.

That is, the drain high concentration region 32 and the source high concentration region 35 are each formed in a self-aligned manner with respect to the sidewall structure 23. Thereby, the drain region 31 which includes the drain high concentration region 32 and the drain low concentration region 33 is formed. Further, the source region 34 which includes the source high concentration region 35 and the source low concentration region 36 is formed.

Next, with reference to FIG. 12O, the gate silicide layer 38, the drain silicide layer 39 and the source silicide layer 40 are formed. In this step, first, a metal film 88 which covers the first wafer main surface 73 and the gate electrode 22 is formed in the device region 6. The metal film 88 contains at least one of Ti, Ni, Co, Mo and W. The metal film 88 may be formed by a sputtering method or a vapor deposition method.

Next, in the gate electrode 22 and the first wafer main surface 73, a portion in contact with the metal film 88 is silicided. Silicidation may be carried out by an annealing method (for example, RTA (rapid thermal anneal) method).

Thereby, the gate silicide layer 38, the drain silicide layer 39 and the source silicide layer 40, each of which contains at least one of TiSi, $TiSi_2$, NiSi, CoSi, $CoSi_2$, $MoSi_2$ and $WSi_2$ are formed. The metal film 88 is removed thereafter.

Next, with reference to FIG. 12P, the interlayer insulating film 41 is formed on the first wafer main surface 73. The interlayer insulating film 41 includes at least one of an oxide film and a nitride film. The interlayer insulating film 41 may be formed by a CVD method. The interlayer insulating film 41 covers the trench insulating structure 10 and the planar gate structure 20 on the first wafer main surface 73.

Next, with reference to FIG. 12Q, a resist mask 89 having a predetermined pattern is formed on the interlayer insulating film 41. The resist mask 89 exposes a region where the plurality of contact holes 47 are to be formed in the interlayer insulating film 41 and covers the other regions. Next, an unnecessary portion of the interlayer insulating film 41 is removed by an etching method via the resist mask 89. The etching method may be a dry etching method (for example, RIE method) and/or a wet etching method. Thereby, the plurality of contact holes 47 are formed in the interlayer insulating film 41. The resist mask 89 is removed thereafter.

Next, with reference to FIG. 12R, a base contact electrode film 90 which serves as bases of the gate contact electrode 42, the drain contact electrode 43 and the source contact electrode 44 fills the plurality of contact holes 47 and is formed on the interlayer insulating film 41. The base contact electrode film 90 has a laminated structure which includes the barrier electrode film 45 and the main electrode 46. The barrier electrode film 45 and the main electrode 46 may be each formed by a sputtering method or a vapor deposition method.

Next, with reference to FIG. 12S, an unnecessary portion of the base contact electrode film 90 is removed by an etching method. The base contact electrode film 90 is removed until the interlayer insulating film 41 is exposed. The etching method may be a dry etching method (for example, RIE method) and/or a wet etching method. Thereby, the gate contact electrode 42, the drain contact electrode 43 and the source contact electrode 44 are formed.

Next, with reference to FIG. 12T, a base wiring film 91 which serves as bases of the gate wiring 48, the drain wiring 49 and the source wiring 50 is formed on the interlayer insulating film 41. The base wiring film 91 has a laminated structure which includes the first barrier wiring film 51, the main wiring film 52 and the second barrier wiring film 53. The first barrier wiring film 51, the main wiring film 52 and the second barrier wiring film 53 may be each formed by a sputtering method or a vapor deposition method.

Next, with reference to FIG. 12U, a resist mask 92 having a predetermined pattern is formed on the base wiring film 91. The resist mask 92 covers a region where the gate wiring 48, the drain wiring 49 and the source wiring 50 are to be formed in the interlayer insulating film 41 and exposes the other regions.

Next, an unnecessary portion of the base wiring film 91 is removed by an etching method via the resist mask 92. The etching method may be a dry etching method (for example, RIE method) and/or a wet etching method. Thereby, the gate wiring 48, the drain wiring 49 and the source wiring 50 are formed on the interlayer insulating film 41. The resist mask 92 is removed thereafter. Then, the Si wafer 72 is cut along the intended cutting lines 79, by which the plurality of semiconductor devices 1 are cut out. After the steps including the above description, the semiconductor device 1 is manufactured.

The present invention can be implemented in still other preferred embodiments. In the aforementioned preferred embodiments, the insulating embedded material 12 may only expose the open end 16 of the trench 11 and is not necessarily required to have the protruded portion 18. That is, the insulating embedded material 12 which is exclusively constituted of the embedded portion 17 may be embedded into the trench 11.

In the aforementioned preferred embodiments, a description has been given of an example in which the "first conductive type" is a "p-type" and the "second conductive type" is an "n-type." However, the "first conductive type" may be an "n-type" and the "second conductive type" may be a "p-type." A specific constitution of this case is obtained by replacing the "p-type region" with the "n-type region" and replacing the "n-type region" with the "p-type region" in the previous description and the attached drawings.

In the aforementioned preferred embodiments, the semiconductor device 1 may include the plurality of trench insulating structures 10, each of which demarcates the device region 6. In this case, a plurality of MOSFETs 7 which are actuated in a mutually different drain/source voltage VDS may be formed in the plurality of device regions 6. The plurality of MOSFETs 7 may include a first MOSFET which is formed in a first device region 6 and actuated in a low voltage and a second MOSFET which is formed in a second device region 6 and actuated in a voltage higher than the first MOSFET. In this case, the first MOSFET may be an LV-MOSFET or an MV-MOSFET. Further, the second MOSFET may be an MV-MOSFET or an HV-MOSFET.

The plurality of MOSFETs 7 may further include a third MOSFET which is formed in a third device region 6 and actuated in a voltage higher than the first MOSFET and also actuated in a voltage lower than the second MOSFET. In this case, the first MOSFET may be an LV-MOSFET, the second MOSFET may be an HV-MOSFET, and the third MOSFET may be an MV-MOSFET.

In the aforementioned preferred embodiments, a description has been given of an example in which the n-type (first polar type) MOSFET 7 including the p-type well region 30, the n-type drain region 31 and the n-type source region 34 is formed. However, a p-type (second polar type) MOSFET 7 including an n-type well region 30, a p-type drain region 31 and a p-type source region 34 may be formed. Further, where the plurality of MOSFETs 7 are formed, a CMOS which includes an n-type MOSFET 7 and a p-type MOSFET 7 may be formed.

Examples of features extracted from the present description and drawings are shown below. The following [A1] to [A20] are to provide a semiconductor device capable of suppressing thinning of an oxide film at an open end of a trench by a novel structure and a method for manufacturing the semiconductor device.

[A1] A semiconductor device comprising: an Si chip which has a main surface facing a {100} plane; a trench which is formed by digging down the main surface and has an open end extending inclined in a <110> direction side with respect to a <100> direction in a plan view; and an oxide film which is constituted of an oxide of the Si chip and formed as a film on the main surface and at the open end.

[A2] The semiconductor device according to A1 wherein, the open end is formed in a curved shape and the oxide film is formed as a curved film along the open end.

[A3] The semiconductor device according to A1 or A2 wherein, the trench is formed in a tapered shape toward a bottom wall.

[A4] The semiconductor device according to anyone of A1 to A3 further comprising: an insulating embedded material which is embedded into the trench such as to expose the open end.

[A5] The semiconductor device according to A4 wherein, the oxide film is connected to the insulating embedded material inside the trench.

[A6] The semiconductor device according to A4 or A5 wherein, the insulating embedded material includes an embedded portion positioned on the bottom wall side of the trench with respect to the open end and a protruded portion positioned above the main surface, and the oxide film is connected to the protruded portion on the main surface side with respect to an upper surface of the protruded portion.

[A7] The semiconductor device according to A6 wherein, the protruded portion is formed in a tapered shape toward a direction away from the trench.

[A8] The semiconductor device according to any one of A1 to A7 wherein, the trench demarcates a device region in the main surface by the open end, and the oxide film is formed as a film at the open end and in the device region.

[A9] The semiconductor device according to A8 wherein, the trench is formed in a quadrilateral annular shape in a plan view to demarcate the device region by the four open ends, each of which extends inclined in the <110> direction side with respect to the <100> direction, and the oxide film covers at least one of the open ends.

[A10] The semiconductor device according to A9 wherein, the oxide film extends along a facing direction of the two open ends which face each other across the device region.

[A11] The semiconductor device according to A9 or A10 wherein, the oxide film covers the two open ends which face each other across the device region.

[A12] The semiconductor device according to anyone of A8 to A11 wherein, the oxide film is constituted of a gate oxide film.

[A13] The semiconductor device according to A12 further comprising: a drain region which is formed in a region on one side with respect to the oxide film on a surface layer portion of the main surface in the device region, a source region which is formed in a region on the other side with respect to the oxide film in the surface layer portion of the main surface in the device region to define a channel with the drain region, and a gate electrode which is formed on the oxide film and faces the channel across the oxide film.

[A14] The semiconductor device according to A13 wherein, the gate electrode faces the open end across the oxide film.

[A15] The semiconductor device according to A13 or A14 wherein, the source region is formed at an interval from the open end.

[A16] The semiconductor device according to any one of A1 to A15 wherein, the oxide film is orthogonal to the open end in a plan view.

[A17] The semiconductor device according to any one of A1 to A16 wherein, the main surface is constituted of a {100} just plane.

[A18] A method for manufacturing a semiconductor device comprising: a step of preparing an Si wafer that has a main surface facing a {100} plane; a step of partially removing the main surface and forming a trench which has an open end extending inclined in a <110> direction side with respect to a <100> direction in a plan view; and a step of forming an oxide film as a film on the main surface and at the open end by an oxidation treatment method to the main surface.

[A19] The method for manufacturing the semiconductor device according to A18 further comprising: a step of forming the open end of the trench in a curved shape; wherein, the oxide film is formed as a curved film along the open end.

[A20] The method for manufacturing the semiconductor device according to A18 or A19 further comprising: a step of forming inside the trench an insulating embedded material that exposes the open end, prior to the oxide film forming step.

While the preferred embodiments of the present invention have been described in detail, these are merely specific examples used to clarify the technical contents of the present invention, the present invention should not be interpreted as being limited to these specific examples, and the scope of the present invention is limited only by the appended claims.

REFERENCE SIGNS LIST 1 semiconductor device
2 Si chip
3 first main surface
6 device region
11 trench
12 insulating embedded material
15 bottom wall
16 open end
16A first open end
16B second open end
16C third open end
16D fourth open end
17 embedded portion
18 protruded portion
21 gate oxide film (oxide film)
22 gate electrode
31 drain region
34 source region
37 channel
42 gate contact electrode
43 drain contact electrode
44 source contact electrode
72 Si wafer
73 first wafer main surface

The invention claimed is:
1. A semiconductor device comprising:
an Si chip which has a main surface facing a {100} plane;
a trench which is formed by digging down the main surface and has an open end extending inclined in a <110> direction side with respect to a <100> direction in a plan view, and which demarcates a device region in the main surface by the open end;

an oxide film which is constituted of an oxide of the Si chip and formed as a film on the main surface and at the open end in the device region, and which is constituted of a gate oxide film;

a drain region which is formed in a region on one side with respect to the oxide film in a surface layer portion of the main surface in the device region;

a source region which is formed in a region on another side with respect to the oxide film in the surface layer portion of the main surface in the device region to define a channel with the drain region; and a gate electrode which is formed on the oxide film and faces the channel across the oxide film.

2. The semiconductor device according to claim 1, wherein
the open end is formed in a curved shape, and
the oxide film is formed as a curved film along the open end.

3. The semiconductor device according to claim 1, wherein
the trench is formed in a tapered shape toward a bottom wall.

4. The semiconductor device according to claim 1 further comprising:
an insulating embedded material which is embedded in the trench so as to expose the open end.

5. The semiconductor device according to claim 4, wherein
the oxide film is connected to the insulating embedded material inside the trench.

6. The semiconductor device according to claim 4, wherein
the insulating embedded material includes an embedded portion positioned on a bottom wall side of the trench with respect to the open end and a protruded portion positioned on an upper side with respect to the main surface, and
the oxide film is connected to the protruded portion on the main surface side with respect to an upper surface of the protruded portion.

7. The semiconductor device according to claim 6, wherein
the protruded portion is formed in a tapered shape toward a direction away from the trench.

8. The semiconductor device according to claim 1, wherein
the trench is formed in a quadrilateral annular shape in a plan view to demarcate the device region by four of the open ends, each of which extends inclined in the <110> direction side with respect to the <100> direction, and
the oxide film covers at least one of the open ends.

9. The semiconductor device according to claim 8, wherein
the oxide film extends along a facing direction of two of the open ends which face each other across the device region.

10. The semiconductor device according to claim 8, wherein
the oxide film covers two of the open ends which face each other across the device region.

11. The semiconductor device according to claim 1, wherein
the gate electrode faces the open end across the oxide film.

12. The semiconductor device according to claim 1, wherein
the source region is formed at an interval from the open end.

13. The semiconductor device according to claim 1, wherein
the oxide film is orthogonal to the open end in a plan view.

14. The semiconductor device according to claim 1, wherein
the main surface is constituted of a {100} just plane.

15. A semiconductor device comprising:
an Si chip which has a main surface facing a {100} plane;
a trench which is formed by digging down the main surface and has an open end extending inclined in a <110> direction side with respect to a <100> direction in a plan view, and which demarcates a device region in the main surface by the open end; and
an oxide film which is constituted of an oxide of the Si chip and formed as a film on the main surface and at the open end in the device region, and which is constituted of a gate oxide film;
wherein the trench is formed in a quadrilateral annular shape in a plan view to demarcate the device region by four of the open ends, each of which extends inclined in the <110> direction side with respect to the <100> direction, and
the oxide film covers at least one of the open ends.

16. The semiconductor device according to claim 15, wherein
the oxide film extends along a facing direction of two of the open ends which face each other across the device region.

17. The semiconductor device according to claim 15 further comprising:
a gate electrode which is formed on the oxide film.

18. The semiconductor device according to claim 15 further comprising:
an insulating embedded material which is embedded in the trench so as to expose the open end.

19. The semiconductor device according to claim 18, wherein
the oxide film is connected to the insulating embedded material inside the trench.

20. The semiconductor device according to claim 18, wherein
the insulating embedded material includes an embedded portion positioned on a bottom wall side of the trench with respect to the open end and a protruded portion positioned on an upper side with respect to the main surface, and
the oxide film is connected to the protruded portion on the main surface side with respect to an upper surface of the protruded portion.

* * * * *